(12) United States Patent
Morita et al.

(10) Patent No.: US 11,009,457 B2
(45) Date of Patent: May 18, 2021

(54) MICROPLATE READER

(71) Applicants: Ushio Denki Kabushiki Kaisha, Tokyo (JP); KYUSHU UNIVERSITY, NATIONAL UNIVERSITY CORPORATION, Fukuoka (JP)

(72) Inventors: Kinichi Morita, Tokyo (JP); Hiroyuki Ohashi, Tokyo (JP); Shinji Suzuki, Tokyo (JP); Yuji Oki, Fukuoka (JP)

(73) Assignees: Ushio Denki Kabushiki Kaisha, Tokyo (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 0 days.

(21) Appl. No.: 16/642,343

(22) PCT Filed: Aug. 30, 2018

(86) PCT No.: PCT/JP2018/032109
§ 371 (c)(1),
(2) Date: Feb. 26, 2020

(87) PCT Pub. No.: WO2019/044969
PCT Pub. Date: Mar. 7, 2019

(65) Prior Publication Data
US 2020/0348230 A1   Nov. 5, 2020

(30) Foreign Application Priority Data
Sep. 1, 2017 (JP) .............................. JP2017-168270

(51) Int. Cl.
*G01N 21/59* (2006.01)
*G01N 21/03* (2006.01)

(52) U.S. Cl.
CPC ............. *G01N 21/59* (2013.01); *G01N 21/03* (2013.01)

(58) Field of Classification Search
CPC ............................... G01N 21/59; G01N 21/03
(Continued)

(56) References Cited

U.S. PATENT DOCUMENTS 5,319,436 A * 6/1994 Manns .................. B01L 3/5085
250/328
2014/0045210 A1   2/2014 Menges et al.
(Continued)

FOREIGN PATENT DOCUMENTS

EP   2696205 A1   2/2014
EP   3073269 A1   9/2016
(Continued)

OTHER PUBLICATIONS

An Office Action; "Notification of Reasons for Refusal," mailed by the Japanese Patent Office dated Jul. 7, 2020, which corresponds to Japanese Patent Application No. 2019-137718 and is related to U.S. Appl. No. 16/642,343 with English language translation.
(Continued)

*Primary Examiner* — Roy M Punnoose
(74) *Attorney, Agent, or Firm* — Studebaker & Brackett PC

(57) ABSTRACT

A microplate reader includes multiple light projecting/receiving units, the number of the light projecting/receiving units being equal to or greater than the number of wells of the microplate, each light projecting/receiving unit including a light projecting unit and a light receiving unit that correspond to one of the wells of the microplate; a reflection member configured to reflect light having passed through samples stored in the wells from the light projecting/receiving units to the light projecting/receiving units; and a light guide part including projecting-light guide paths each configured to guide the light emitted from the light projecting unit to the sample, receiving-light guide paths each config-
(Continued)

ured to guide the light reflected by the reflection member and having passed through the sample to the light receiving unit, and a surrounding member including a pigment-containing resin surrounding the projecting-light guide paths and the receiving-light guide paths.

22 Claims, 16 Drawing Sheets

(58) Field of Classification Search
USPC .......................................................... 356/444
See application file for complete search history.

(56) References Cited

U.S. PATENT DOCUMENTS

| | | |
|---|---|---|
| 2015/0224507 A1 | 8/2015 | Menges et al. |
| 2015/0233815 A1 | 8/2015 | Menges et al. |

FOREIGN PATENT DOCUMENTS

| | | | |
|---|---|---|---|
| JP | 2004041815 A | 2/2004 | |
| JP | 2005345274 A | 12/2005 | |
| JP | 2009103480 A | 5/2009 | |
| JP | 2014-032064 A | 2/2014 | |
| JP | 2014041121 A | 3/2014 | |
| JP | 2016-173265 A | 9/2016 | |
| WO | WO-2020054561 A1 * | 3/2020 | ............ G01N 21/03 |

OTHER PUBLICATIONS

International Search Report issued in PCT/JP2018/032109; dated Nov. 20, 2018.
An Office Action mailed by the Japanese Patent Office dated Oct. 6, 2020, which corresponds to Japanese Patent Application No. 2019-137718 and is related to U.S. Appl. No. 16/642,343 with English language translation.

* cited by examiner

MICROPLATE READER

TECHNICAL FIELD

The present invention relates to microplate readers for performing optical measurements on samples contained in microplate wells.

BACKGROUND ART

Conventionally, reagent separation, synthesis, extraction, analysis, cell culture, etc. have been performed using a flat microplate made of, for example, acrylic, polyethylene, polystyrene, glass, etc., provided with a number of recesses (wells). For example, a microplate is used for measurements (for example, measurements using the ELISA method) for an antibody-antigen reaction (enzyme immune reaction) generated by injecting a reagent containing an antigen into each well in which an antibody is immobilized.

For the sample stored in each well of the microplate, for example, optical properties of the sample are measured. This measurement is performed by a microplate reader that is a measurement device for performing optical measurements on samples. The microplate reader can measure optical properties, such as absorption, fluorescence, chemiluminescence, and fluorescence polarization.

As an example of a conventional microplate reader, there is a technique described in Patent Document 1 (Japanese Patent Application Laid-Open Publication No. 2014-41121). The microplate reader described in Patent Document 1 (Japanese Patent Application Laid-Open Publication No. 2014-41121) includes an optical measuring/detecting device (measuring head) that irradiates samples with light and observes light emission from the irradiated samples for optical measurement. Light irradiation from the measuring head to the microplate is performed from below the wells of the microplate, and the measuring head measures the observation light emitted above the wells. The measuring head is stationary, whereas the microplate is traversed in two dimensional directions (X direction and Y direction) by a driving mechanism in the microplate reader so that each well is positioned on the detection axis (axis perpendicular to the microplate, Z axis).

Patent Document 2 (Japanese Unexamined Patent Application Publication No. 2009-103480) discloses a microplate reader that is miniaturized so as to be portable. The microplate reader described in Patent Document 2 (Japanese Patent Application Laid-Open Publication No. 2009-103480) has a space into which a microplate having eight wells arranged in a row can be inserted, the space being formed such that the microplate can slide. The microplate reader has a configuration in which light is irradiated on samples stored in the wells from a position above the space and the upper surface of the microplate having the wells. A photodiode for detecting light having exited from the samples is provided in a lower portion of the space. The microplate reader executes optical measurement while sliding the microplate in the space.

BACKGROUND DOCUMENTS

Patent Documents

Patent Document 1: Japanese Patent Application Laid-Open Publication No. 2014-41121

Patent Document 2: Japanese Patent Application Laid-Open Publication No. 2009-103480

SUMMARY OF THE INVENTION

Problems to be Solved by the Invention

However, the microplate reader described in Patent Document 1 (Japanese Patent Application Laid-Open No. 2014-41121) cannot measure all the samples stored in the wells of one microplate in one measurement step. In order to measure all the samples stored in the wells, it is necessary to traverse the microplate and perform multiple optical measurement steps, which is time consuming. In addition, in the microplate reader described in Patent Document 1 (Japanese Patent Application Laid-Open No. 2014-41121), a driving mechanism for traversing the microplate is indispensable for each optical measurement step, which necessitates a large device.

Therefore, it is difficult to cope with size reduction of devices demanded in fields such as point-of-care testing (POCT) in the life sciences.

The microplate reader described in Patent Document 2 (Japanese Patent Application Laid-Open No. 2009-103480) is reduced in size so as to be portable, but as similar to that in Patent Document 1 (Japanese Patent Application Laid-Open No. 2014-41121), the microplate reader cannot measure all the samples stored in the wells of one microplate in one measurement step. In addition, it is necessary to traverse the microplate having eight wells in one direction for each optical measurement step, which is time consuming. In addition, it cannot cope with a microplate in which wells are arranged in two dimensional directions.

Furthermore, external light may enter the space into which the microplate is inserted as light noise, so that optical measurement of the samples stored in the wells cannot be performed with high accuracy.

Accordingly, it is an object of the present invention to provide a microplate reader that can be reduced in size and that can perform optical measurement of all samples stored in all wells of a microplate with high accuracy in a short time.

Solution to Problems

In order to solve the above-described problems, an aspect according to the present invention provides a microplate reader including: a housing; multiple light projecting/receiving units located on a side of the microplate located within the housing, the number of the light projecting/receiving units being equal to or greater than the number of wells of the microplate, each light projecting/receiving unit comprising a set having a light projecting unit and a light receiving unit that correspond to one of the wells of the microplate; a reflection member located on a side of the microplate opposite to a side of the light projecting/receiving units and configured to reflect light having passed through samples stored in the wells from the side of the light projecting/receiving units to the side of the light projecting/receiving units; and a light guide part disposed between the light projecting/receiving units and the microplate, the light guide part including projecting-light guide paths each configured to guide the light emitted from the light projecting unit to the sample, receiving-light guide paths each configured to guide the light reflected by the reflection member and having passed through the sample to the light receiving unit, and a surrounding member including a pigment-containing resin surrounding the projecting-light guide paths and the receiving-light guide paths, the pigment-containing resin including a pigment having a property of absorbing light.

Thus, a set of the light projecting unit and the light receiving unit is provided for one well, and the sets of the light projecting units and the light receiving units are provided for all wells, respectively. Therefore, it is possible to perform the entire optical measurement for all samples stored in all wells of the microplate substantially simultaneously, and the measurement time can be shortened. In addition, since a complicated drive mechanism, etc., for traversing the microplate, as in the prior art, is not necessary, reduction in size of the device can be realized. Furthermore, since the light guide paths are surrounded by a pigment-containing resin that can absorb external light and scattered light, it is possible to limit external light, scattered light, and the like entering into the light receiving unit as stray light (light noise). Therefore, measurement errors due to the stray light can be reduced, and measurement can be made with high accuracy.

In the microplate reader, the light guide part may be located above the light projecting/receiving units, and the reflection member may be located above the microplate located above the light guide part.

Thus, the microplate reader may have a structure in which the light guide part is located above the light projecting/receiving units, the microplate is located above the light guide part, and the reflection member is located above the microplate. In this case, the light projecting/receiving units and the light guide part may be fixed in the housing, whereas the microplate storing the samples may be placed on the light guide part, and the upper part of the microplate may be covered with the reflection member. Accordingly, the microplate reader can be easily set.

Furthermore, the microplate reader may further include a substrate including a power supply circuit for feeding power to multiple light projecting units and light receiving units, each of the light projecting units and the light receiving units being electrically connected to the substrate.

In this case, power supply to multiple light projecting units and light receiving units can be realized by a single printed board on which a wiring pattern is formed, so that the microplate reader can be reduced in size.

In the microplate reader, the light projecting units may be light emitting diodes. Since light emitting diodes (LEDs) are small, it is possible to deploy each light projecting unit corresponding for a well appropriately. Furthermore, since LEDs are inexpensive, the microplate reader can be produced at low cost.

Furthermore, in the microplate reader, the light receiving units may be light receiving sensors. In this case, the light receiving units may be a color sensor, and measurement data can be easily obtained.

Alternatively, in the microplate reader, the light receiving units may be optical fibers. In this case, light guided by multiple optical fibers may be captured by an image sensor, so that optical measurement data can be obtained as image data. In this case, it is possible to simultaneously process the light measurement data corresponding to all the wells at once.

In addition, in the microplate reader, the reflection member may be selectively provided on a surface facing the microplate depending on positions of the projecting-light guide paths and the receiving-light guide paths.

In this case, it is possible to prevent part of the light that has passed through a well and reached the mirror plate from entering another well neighboring the original well. Therefore, a highly accurate measurement result can be obtained.

In addition, in the microplate reader, a horizontal distance between a light exit end of the projecting-light guide path and a light entrance end of the receiving-light guide path may be shorter than a horizontal distance between a light entrance end of the projecting-light guide path and a light exit end of the receiving-light guide path.

In this case, the light emitted from the light projecting unit, passed through the well of the microplate, and returned by the reflection member can be passed through the well again and appropriately guided to the light receiving unit. That is, even when the light projecting units and the light receiving units are arranged on one side in the direction perpendicular to the microplate (even when the light projecting units and the light receiving units are not arranged on both sides of the microplate in the perpendicular direction), the samples stored in the wells can be irradiated with light, and the light having passed through the samples can be measured.

Alternatively, in the microplate reader, an angle between an optical axis of the projecting-light guide path and a perpendicular direction that is perpendicular to the microplate may be 0 degrees, and an angle between an optical axis of the receiving-light guide path and the perpendicular direction may be 0 degrees. In this case, the light guide part can be formed easily.

In addition, in the microplate reader, the reflection member may include optical elements configured to return incident light that has passed through the projecting-light guide paths and is incident on the reflection member at 180 degrees for causing the light to travel toward the side of the light projecting/receiving units. In this case, the light from the light projecting unit having exited from the projecting-light guide path and traveling in the perpendicular direction is returned 180 degrees for traveling to the opposite side in the perpendicular direction, and can be received by the light receiving unit through the receiving-light guide path.

In addition, in the microplate reader, an optical axis of the incident light that has passed through the projecting-light guide path and is incident on the reflection member and an optical axis of a returned light returned 180 degrees by the reflection member for entering the receiving-light guide path may be spaced apart from each other at a predetermined interval.

In this case, even when the optical axis of the projecting-light guide path and the optical axis of the receiving-light guide path are spaced apart at a predetermined interval in the horizontal direction, the light from the light projecting unit having exited from the projecting-light guide path and traveling in the perpendicular direction can enter the receiving-light guide path appropriately.

In the microplate reader, the reflection member may include first reflecting surfaces inclined at an angle of 45 degrees with respect to the perpendicular direction and second reflecting surfaces inclined at an angle of −45 degrees with respect to the perpendicular direction.

In this case, the incident light that has passed through the projecting-light guide path and is incident on the reflection member is reflected 90 degrees by one of the first reflecting surface and the second reflecting surface, and is then incident on the other reflecting surface, by which the light is further reflected 90 degrees. In this way, the incident light can be appropriately returned 180 degrees for traveling toward the side of the light projecting/receiving units.

Furthermore, in the microplate reader, the reflection member may include right-angle prisms each including the first reflecting surface and the second reflecting surface. In this case, the incident light that has passed through the projecting-light guide path and is incident on the reflection member can be appropriately returned 180 degrees for traveling toward the side of the light projecting/receiving units.

Alternatively, in the microplate reader, the reflection member may be a plate member including recesses each including the first reflecting surface and the second reflecting surface. In this case, the incident light that has passed through the projecting-light guide path and is incident on the reflection member can be appropriately returned 180 degrees for traveling toward the side of the light projecting/receiving units.

Furthermore, in the microplate reader, each of the first reflecting surfaces and the second reflecting surfaces may extend along an alignment direction of the wells. In this case, a reflection member may be provided corresponding to multiple wells aligned in one direction. Accordingly, the number of parts can be reduced. In addition, the number of steps for aligning the microplate and the reflection member can be reduced.

Alternatively, in the microplate reader, the reflection member may be a scattering plate that has a flat plate shape, the scattering plate configured to scatter incident light that has passed through the projecting-light guide paths and is incident on the reflection member for returning the light at 180 degrees for causing the light to travel toward the side of the light projecting/receiving units.

In this case, even when the optical axis of the projecting-light guide path and the optical axis of the receiving-light guide path are spaced apart at a predetermined interval in the horizontal direction, the light from the light projecting unit having exited from the projecting-light guide path and traveling in the perpendicular direction can enter the receiving-light guide path appropriately. In addition, accuracy in the alignment of the microplate and the reflection member is not necessary.

Alternatively, in the microplate reader, the reflection member may include retroreflector type optical elements each including three reflecting surfaces and being configured to reflect incident light that has passed through a projecting-light guide path and is incident on the reflection member three times for returning the light at 180 degrees for causing the light to travel toward the side of the light projecting/receiving units. In this case, the incident light that has passed through the projecting-light guide path and is incident on the reflection member can be appropriately returned 180 degrees for traveling toward the side of the light projecting/receiving units.

Furthermore, in the microplate reader, a resin having a light transmission characteristic may be embedded into at least parts of the projecting-light guide paths and the receiving-light guide paths, the resin being the same as a light-transmitting resin material in the pigment-containing resin.

In this case, reflection and scattering of light at the interface between each light guide path and the surrounding member can be reduced. Therefore, measurement errors due to the stray light can be reduced more effectively.

Another aspect according to the present invention provides a microplate reader unit including: a light projecting/receiving unit including a light projecting unit and a light receiving unit corresponding to one of wells of a microplate; and a light guide part including a projecting-light guide path configured to guide light emitted from the light projecting unit to a sample stored in the corresponding well, a receiving-light guide path configured to guide light having passed through the projecting-light guide path and the sample, having returned, and having passed through the sample again to the light receiving unit, and a surrounding member including a pigment-containing resin surrounding the projecting-light guide path and the receiving-light guide path, the pigment-containing resin including a pigment having a property of absorbing light.

According to this aspect, it is possible to form a microplate reader that can be reduced in size and that can perform optical measurement of all samples contained in all wells of a microplate with high accuracy in a short time.

In addition, in the microplate reader unit, an angle between an optical axis of the projecting-light guide path and a perpendicular direction that is perpendicular to the microplate may be 0 degrees, and an angle between an optical axis of the receiving-light guide path and the perpendicular direction may be 0 degrees. In this case, the light guide part can be formed easily.

Advantageous Effects of the Invention

The microplate reader of the present invention can be reduced in size, and can perform optical measurement of all samples stored in all wells of a microplate with high accuracy in a short time.

The above-described objects, aspects, and advantages of the present invention, and objects, aspects, and advantages of the present invention that have not been described above will be understood by those skilled in the art from the following description of embodiments (detailed description of the invention) with reference to the accompanying drawings and the claims.

DESCRIPTION OF EMBODIMENTS

Hereinafter, embodiments of the present invention will be described with reference to the drawings.

First Embodiment

Figure 1:
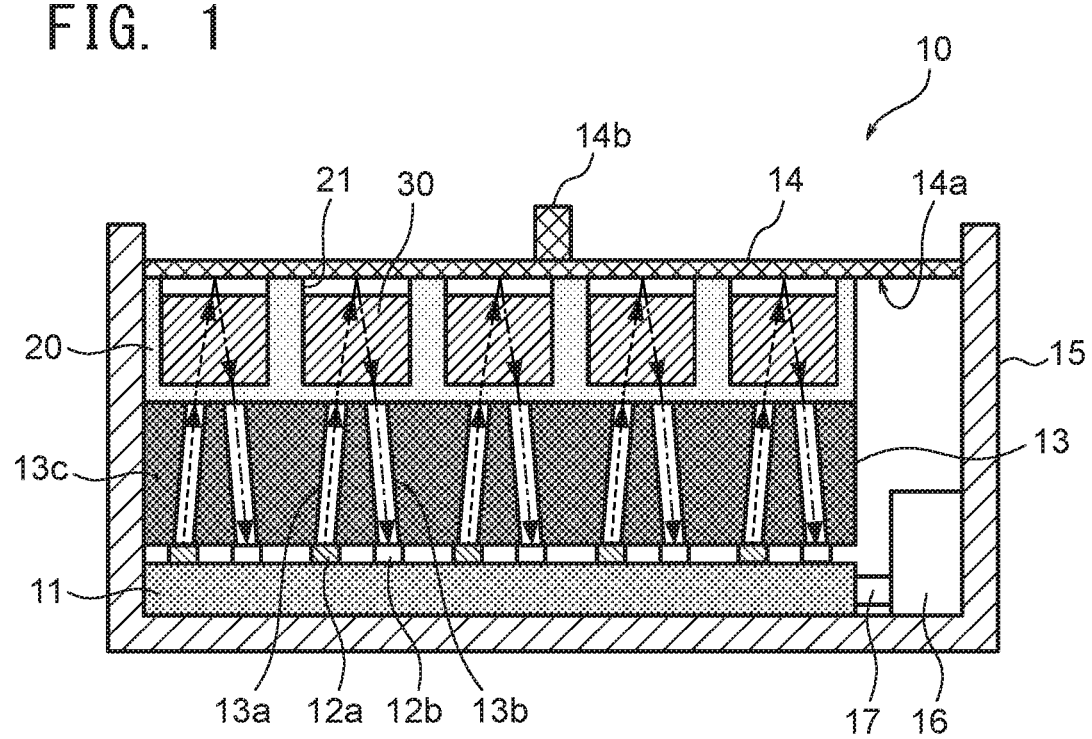
FIG. 1 is a schematic configuration diagram of a microplate reader in an embodiment of the present invention.
Figure 2:
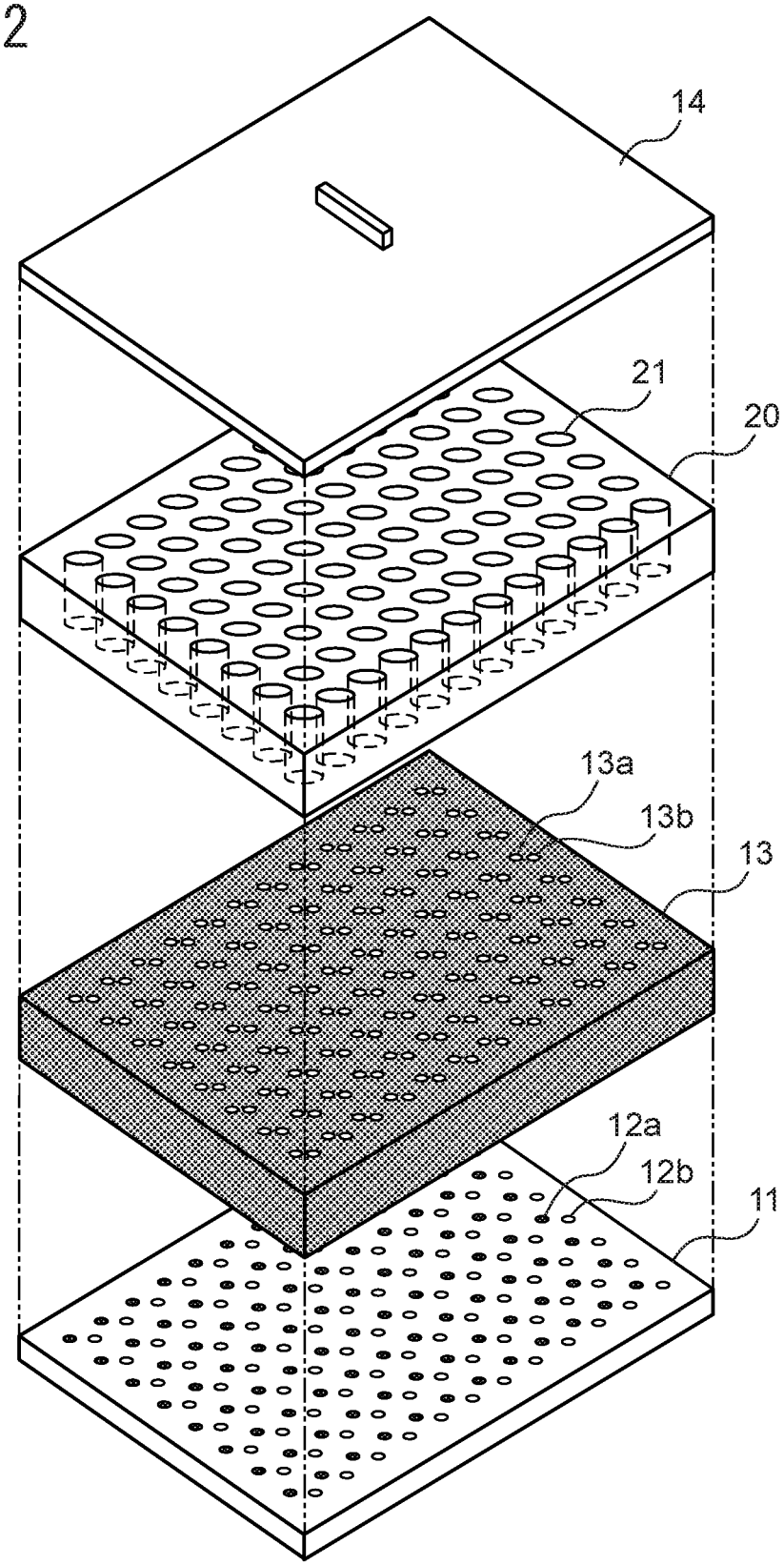
FIG. 2 is an exploded perspective view of a main part of the microplate reader.

FIG. 1 is a schematic configuration diagram of a microplate reader 10 in the present embodiment. FIG. 2 is an exploded perspective view showing a configuration of a main part of the microplate reader 10.

The microplate reader 10 includes a substrate 11, multiple light sources 12a, multiple light receiving sensors 12b, a light guide plate part (light guide part) 13, a mirror plate (reflection member) 14, a housing 15, a power source unit 16, and a power feeding cable 17.

The substrate 11, the multiple light sources 12a, the multiple light receiving sensors 12b, the light guide plate part 13, the power source unit 16, and the power feeding cable 17 are located in and fixed to a housing 15 having an opening above. As shown in FIG. 2, the microplate reader 10 in the present embodiment is configured such that multiple light projecting/receiving units, including multiple light sources 12a and multiple light receiving sensors 12b, are provided above the substrate 11, whereas the light guide plate part 13 is provided above the light projecting/receiving units. A microplate 20 can be deployed above the light guide plate part 13 within the housing 15.

The microplate reader 10 is also configured such that the mirror plate 14 is disposed above the microplate 20 deployed above the light guide plate part 13. A surface 14a of the mirror plate 14 facing the microplate 20 is a reflecting surface (mirror surface). The mirror plate 14 closes the opening of the housing 15 and functions as an upper lid of the microplate 20.

Microplate

The microplate 20 is a flat plate member made of, for example, acrylic, polyethylene, polystyrene, glass, etc. As shown in FIG. 2, the microplate 20 is, for example, a rectangular flat plate and has a large number of wells 21 on the obverse surface. The shape of each well 21 is, for example, a cylindrical shape having a flat bottom. The number of wells 21 is 6, 24, 96, 384, etc., and the capacity of each well 21 is several microliters to several milliliters. The microplate 20 shown in FIG. 2 is a 96-well microplate (8 columns×12 rows).

Light Projecting/Receiving Unit

The light source 12a is a light projecting unit that emits light, whereas the light receiving sensor 12b is a light receiving unit that receives light. Each of the light sources 12a and the light receiving sensors 12b is disposed on the upper surface of the substrate 11. The light source 12a is, for example, a light emitting diode (LED), and the light receiving sensor 12b is, for example, an RGB color sensor.

The microplate reader 10 includes the same number of light sources 12a and the same number of light receiving sensors 12b as the number of wells 21 in the microplate 20. In other words, one set of light projecting/receiving unit including a light source 12a and a light receiving sensor 12b is provided corresponding to one well 21 in the microplate 20. For example, as shown in FIG. 2, when there are 96 wells 21 in the microplate 20, the substrate 11 is provided with 96 sets of light projecting/receiving units.

Substrate

The substrate 11 has light-source-power-supply lines to which the light sources 12a are connected and sensor-power-supply lines to which the light receiving sensors 12b are connected. The multiple light sources 12a are connected to the light-source-power-supply lines provided on the substrate 11, and obtain power from the light-source-power-supply lines. The multiple light receiving sensors 12b are connected to the sensor-power-supply lines provided on the substrate 11, and obtain power from the sensor-power-supply lines. Power is supplied from the power source unit 16 to the light-source-power-supply lines and sensor-power-supply lines in the substrate 11 via the power feeding cable 17.

Figure 3:
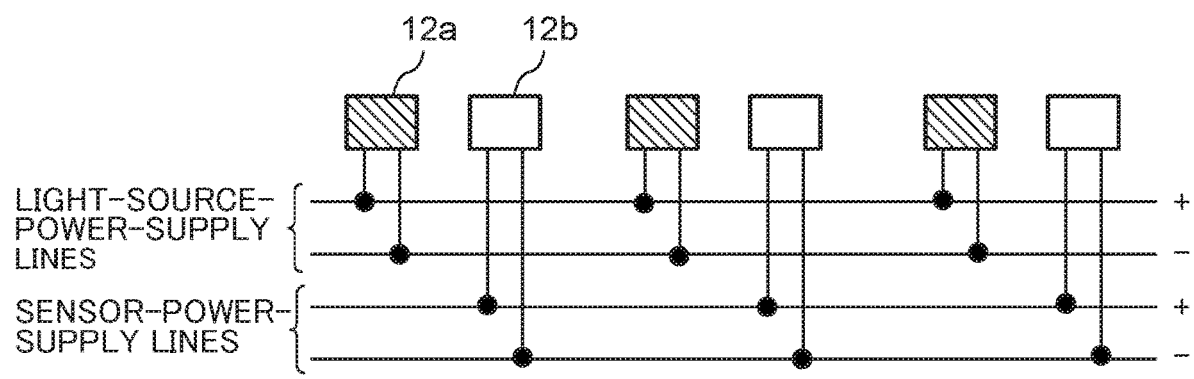
FIG. 3 is an example of power supply lines for light sources and sensors.

The multiple light sources 12a are connected to the light-source-power-supply lines and are connected in parallel to one another, for example, as shown in FIG. 3. Similarly, the multiple light receiving sensors 12b are connected to the sensor-power-supply lines and are connected in parallel to one another, for example, as shown in FIG. 3.

Two power supply wirings are connected to each of the light sources 12a and the light receiving sensors 12b. Therefore, when 96 sets of light projecting/receiving units are provided as in this embodiment, 384 wires are needed. In order to integrate such a large number of wires in a compact manner, the substrate 11 is configured as a printed board on which a wiring pattern (power supply circuit) is formed. The substrate 11 may be provided with not only a power supply circuit for the light sources 12a and the light receiving sensors 12b, but also a sensor output circuit, a communication circuit for transmitting the sensor outputs to the outside, etc.

Light Guide Plate Part

The light guide plate part 13 includes projecting-light guide paths 13a, each of which guides light emitted from a light source 12a in the substrate 11 to one of the wells 21 in the microplate 20, and receiving-light guide paths 13b, each of which guides light having passed through a sample 30 or the like stored in a well 21 to a light receiving sensor 12b, as will be described later.

The light guide plate part 13 includes the same number of light guide paths 13a and the same number of light guide paths 13b as the number of wells 21 in the microplate 20. That is, one set of light guide paths including a projecting-light guide path 13a and a receiving-light guide path 13b is provided corresponding to one well 21 in the microplate 20. For example, as shown in FIG. 2, when there are 96 wells 21 in the microplate 20, the light guide plate part 13 includes 96 sets of light guide paths.

The light entrance ends of the projecting-light guide paths 13a and the light exit ends of the receiving-light guide paths 13b of the light guide plate part 13 are arranged at positions corresponding to the light sources 12a and the light receiving sensors 12b located above the substrate 11, respectively.

The light exit ends of the projecting-light guide paths 13a and the light entrance ends of the receiving-light guide paths 13b of the light guide plate 13 are arranged at positions corresponding to the bottom surfaces of the wells 21 in the microplate 20 located above the light guide plate 13, respectively. That is, by a positioning means (not shown), the microplate 20 is positioned in such a manner that the bottom surface of each well 21 faces the light exit end of a projecting-light guide path 13a and the light entrance end of a receiving-light guide path 13b.

The projecting-light guide paths 13a are formed of a resin (for example, silicone resin) that is transparent to the light emitted from the light sources 12a. Similarly, the receiving-light guide paths 13b are formed of a resin (for example, silicone resin) that is transparent to the light having exited from samples 30 or the like stored in the wells 21. The projecting-light guide paths 13a and the receiving-light guide paths 13b are surrounded by a surrounding member 13c made of a pigment-containing resin. The pigment-containing resin is a resin containing a pigment having properties of absorbing stray light, the resin itself having light transmitting properties (for example, silicone resin). For example, carbon black, which is a black pigment, can be used as the pigment.

In the present embodiment, the transparent resin material forming the light guide paths 13a and 13b is the same as the light-transmitting resin material forming the pigment-containing resin. Accordingly, reflection and scattering at the interface between the two resins are reduced. In addition, stray light having entered the pigment-containing resin is absorbed by the pigment-containing resin, and is unlikely to return to the light guide paths 13a and 13b, so that complicated multiple reflection of stray light is unlikely to occur.

Figure 4:
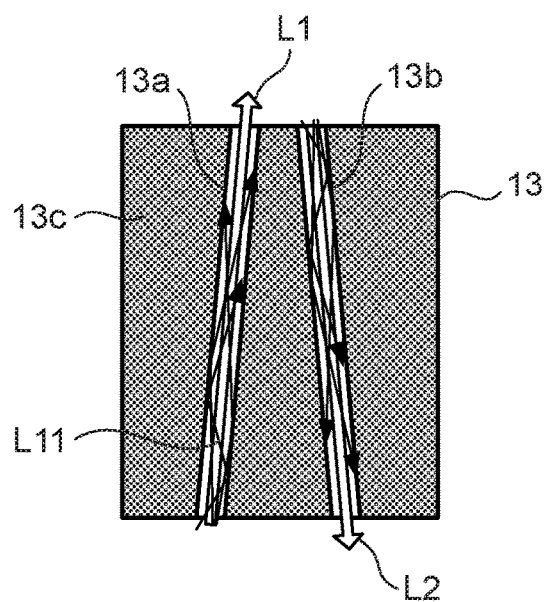
FIG. 4 is a diagram illustrating external light entering light guide paths.

As shown in FIG. 4, light noise L11, such as external light, having entered each of the light guide paths 13a and 13b has very few components traveling in the same direction as the optical axis of each of the light guide paths 13a and 13b, and most of the light noise L11 enters the pigment-containing resin through the interface between each of the light guide paths 13a and 13b and the surrounding member 13c formed of the pigment-containing resin and is absorbed by the pigment. Reflection at the interface does not occur in the case in which the transparent resin material forming the light guide paths 13a and 13b is the same as the light-transmitting resin material forming the pigment-containing resin.

External light entering the pigment and scattered light thereof are substantially absorbed by the pigment, but are slightly scattered by the pigment surface. However, the scattered light is unlikely to enter the surrounding member 13c made of the pigment-containing resin again, and is absorbed by the pigment of the pigment-containing resin.

Therefore, as shown in FIG. 4, most of the light that exited from the projecting-light guide path 13a is a straight light L1 along the optical axis of the projecting-light guide path 13a, whereas most of the light that exited from the receiving-light guide path 13b is a straight light L2 along the optical axis of the receiving-light guide path 13b.

Depending on the defining of the cross-sectional areas and the light route lengths of the light guide paths 13a and 13b, part of a scattered light slightly scattered by the pigment surface may exit from the light exit end of each of the light guide paths 13a and 13b. Therefore, it is preferable to appropriately define the cross-sectional areas and the light route lengths of the light guide paths 13a and 13b for attenuating the intensity of scattered light to a level that does not affect measurement.

If the area of the light entrance end of a light guide path increases, the amount of light entering the light guide path increases. Therefore, if the area of the light entrance end increases, the intensity of the straight light traveling through the light guide path and the intensity of the scattered light reaching the light exit end, resulting from the external light having been scattered by the light entrance end of the light guide path, increase.

The inventors investigated the intensity dependence of straight light and the intensity dependence of external light on the area of the light entrance end of the light guide path. As a result, it was found that the amount of increase in the intensity of external light with respect to the increase in the diameter of the light guide path is greater than the amount of increase in the intensity of measurement light.

In other words, it was found that the S/N ratio is improved as the area of the light entrance end of the light guide is narrower. Specifically, it was found that if the ratio ($\sqrt{A}/L$) of the square root of the area (A) of the light entrance end of the light guide path to the distance (L) from the light entrance end to the light exit end is 0.4 or less, optical measurement with a sufficiently high S/N ratio is possible.

Accordingly, it is preferable to define the cross-sectional areas and the light route lengths of the light guide paths 13a and 13b so as to satisfy the above condition. Then, it is possible to reduce adverse effect of scattered light on the optical measurement.

Mirror Plate

A surface 14a of the mirror plate 14 facing the microplate 20 is a reflecting surface (mirror surface). Therefore, light emitted from each light source 12a, having passed through a projecting-light guide path 13a of the light guide plate part 13, and having passed through a sample 30 stored in a well 21 in the microplate 20 reaches the mirror plate 14, and is reflected by the reflecting surface 14a of the mirror plate 14.

In the present embodiment, the horizontal distance between the light exit end of the projecting-light guide path 13a and the light entrance end of the receiving-light guide path 13b is shorter than the horizontal distance between the light entrance end of the projecting-light guide path 13a and the light exit end of the receiving-light guide path 13b. That is, when the vertical direction in FIG. 1 is defined as the normal direction for the mirror plate 14, the optical axes of the projecting-light guide paths 13a and the optical axes of the receiving-light guide paths 13b are inclined at angles with respect to the normal direction, respectively.

Therefore, the light reflected by the reflecting surface 14a of the mirror plate 14 passes again through the samples 30 stored in the wells 21 in the microplate 20 and through the receiving-light guide paths 13b in the light guide plate part 13, and enters the light receiving sensors 12b.

The angles between the optical axes of the projecting-light guide paths 13a and the normal direction and the angles between the optical axes of the receiving-light guide paths 13b and the normal direction are defined appropriately in order that the light emitted from the light sources 12a and reflected by the reflecting surface 14a of the mirror plate 14 can enter the light receiving sensors 12b appropriately. Hereinafter, this will be described in detail with reference to FIG. 5.

Figure 5:
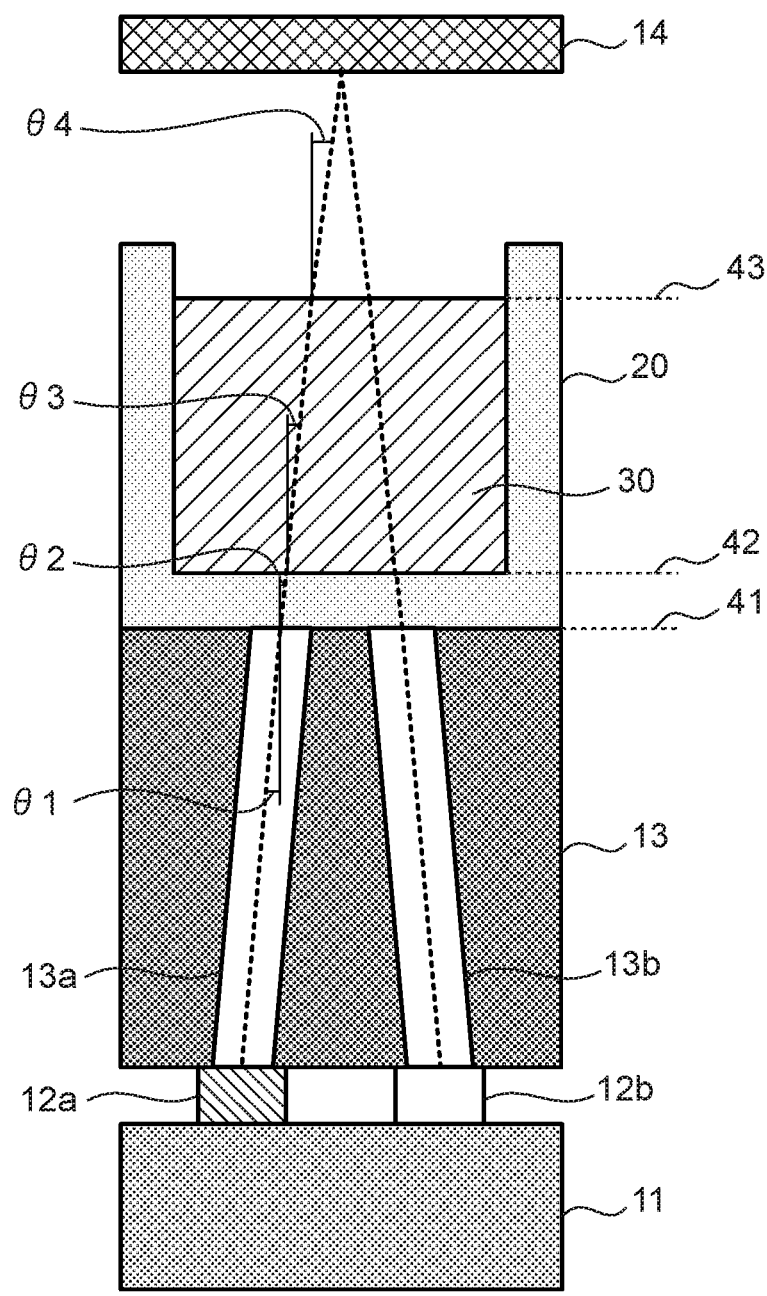
FIG. 5 is a diagram for explaining a route of light.

In FIG. 5, in order to facilitate understanding of the route of light, the mirror plate 14 is shown to be spaced apart from the microplate 20 to some extent. Actually, the mirror plate 14 is placed on the microplate 20, functions as an upper lid of the microplate 20 for minimizing intrusion of external light from above the microplate 20. However, in a case in which the influence of external light from above the microplate 20 can be ignored, an interval may be provided between the mirror plate 14 and the microplate 20.

As shown in FIG. 5, paths through which light passes located between the light guide paths 13a and 13b and the mirror plate 14 include multiple interfaces 41 to 43. The interface 41 is the boundary face between the end surfaces of the light guide paths 13a and 13b (the light exit end of the projecting-light guide path 13a and the light entrance end of the receiving-light guide path 13b) made of a resin (for example, silicone resin) and the bottom surface of the microplate 20. The interface 42 is the boundary face between the bottom surface of the well 21 in the microplate 20 and the sample 30. The interface 43 is the boundary face between the sample 30 and air. Since the media are different across each of the interfaces 41 to 43, light is refracted thereat.

Therefore, the angle between the optical axis of the projecting-light guide path 13a and the normal direction and the angle between the optical axis of the receiving-light guide paths 13b and the normal direction should be determined considering the refraction of light, respectively.

For example, if the resin material of the light guide paths 13a and 13b is PDMS (polydimethylsiloxane) resin and if the material of the microplate 20 is polystyrene, the refractive index of the light guide paths 13a and 13b is 1.41, whereas that of the microplate 20 is 1.59. Hereinafter, assuming that the refractive index of the sample 30 is equivalent to that of water (1.33) that the refractive index of air is 1, and the influence of the light refraction will be discussed.

In FIG. 5, the angle between the optical axis of the projecting-light guide paths 13a and the normal direction is defined as θ1. In this case, the incident angle from the projecting-light guide path 13a to the microplate 20 is θ1. If the refraction angle of light passing through the microplate 20 is θ2, the following equation is established according to Snell's law.

$$1.41 \times \sin θ1 = 1.59 \times \sin θ2. \quad (1)$$

For example, if θ1 is 5 degrees, θ2 is 4.43 degrees according to equation (1).

Similarly, if the incident angle from the microplate 20 to the sample 30 is θ2, and if the refraction angle of light passing through the sample 30 is θ3, the following equation is established according to Snell's law.

$$1.59 \times \sin θ2 = 1.33 \times \sin θ3. \quad (2)$$

θ2 is 4.43 degrees according to equation (1), and therefore, θ3 is 5.30 degrees according to equation (2).

Similarly, if the incident angle from the sample 30 to the air is θ3, and if the refraction angle of the light passing through the air and reaching the reflecting surface 14a of the mirror plate 14 is θ4, the following equation is established according to Snell's law.

$$1.33 \times \sin θ3 = 1 \times \sin θ4. \quad (3)$$

θ3 is 5.30 degrees according to equation (2), and therefore, θ4 is 7.05 degrees according to equation (3).

Thus, under the above conditions, an angle difference of about 2 degrees occurs between θ1 and θ4. Therefore, it is preferable to determine the angle between the optical axis of the projecting-light guide path 13a and the normal direction and the angle between the optical axis of the receiving-light guide paths 13b and the normal direction, in consideration of the above-described angle difference.

However, for example, if the diameter of the wells 21 in the microplate 20 is about 6 mm to 7 mm, if the depth of the well 21 is about 10 mm to 11 mm, if the thickness of the light guide plate part 13 is about 10 mm, and if the distance between the obverse surfaces of the samples 30 stored in the microplate 20 and the reflecting surface 14a of the mirror plate 14 is about 1 mm, the distance from the light guide plate part 13 to the reflecting surface 14a of the mirror plate 14 is about 20 mm. Consequently, the light route length from the light source 12a to the mirror plate 14 and the light route length from the mirror plate 14 to the light receiving sensor 13b are less than 30 mm.

Under the above conditions, the difference between θ1 and θ4 is about 2 degrees as described above. Therefore, if the light route length is relatively short, i.e., is less than 30 mm, the influence of refraction at each of interfaces 41 to 43 on the light path from the light guide plate part 13 to the mirror plate 14 can be regarded as being small.

Next, a setting method of the microplate reader 10 in this embodiment will be described.

Figure 6:
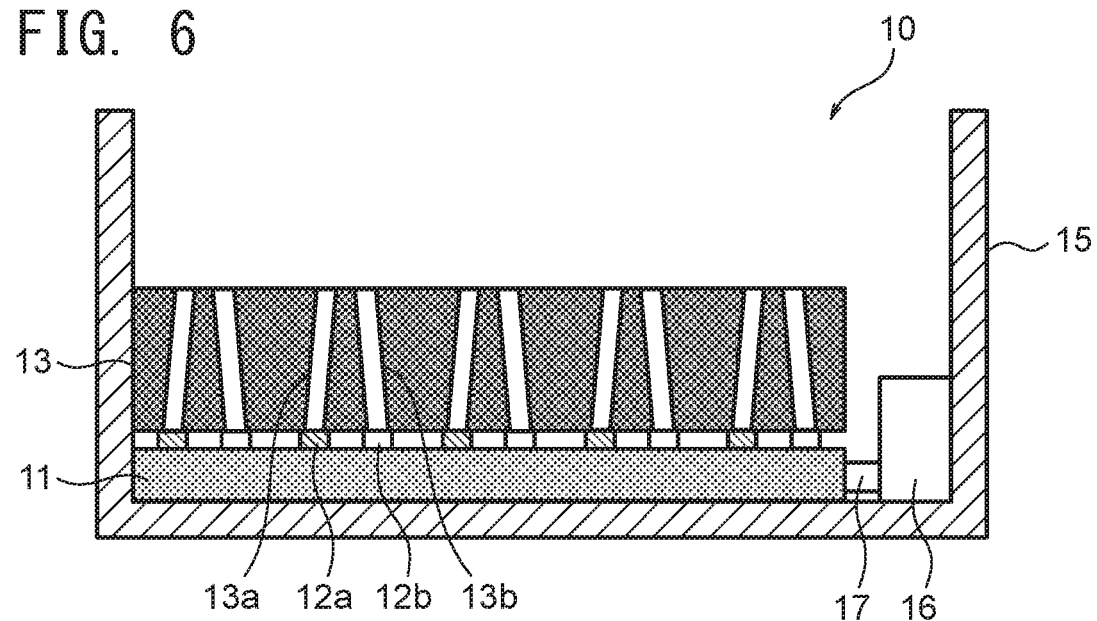
FIG. 6 is a diagram for explaining a setting method of the microplate reader.
Figure 7:
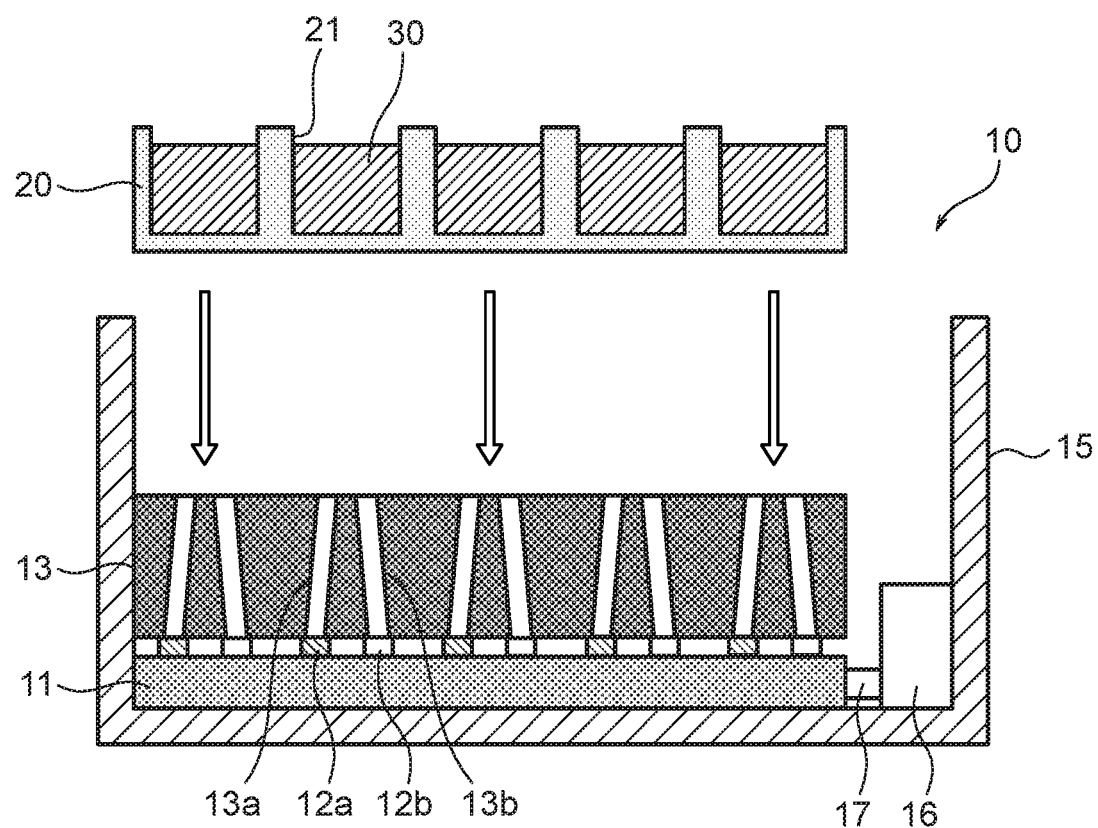
FIG. 7 is a diagram for explaining a setting method of the microplate reader.

As shown in FIG. 6, the microplate reader 10 is prepared such that the substrate 11, the multiple light sources 12a, the multiple light receiving sensors 12b, the light guide plate part 13, the power source unit 16, and the power feeding cable 17 are fixed to inside the housing 15. A human operator attaches the microplate 20, in which samples 30 are stored in wells 21, to the microplate reader 10, as shown in FIG. 7. At this time, the microplate 20 is placed on the light guide plate part 13. At this time, the bottom surface of each well 21 in the microplate 20 is positioned to be aligned with the light exit end of a projecting-light guide path 13a and the light entrance end of a receiving-light guide path 13b.

Figure 8:
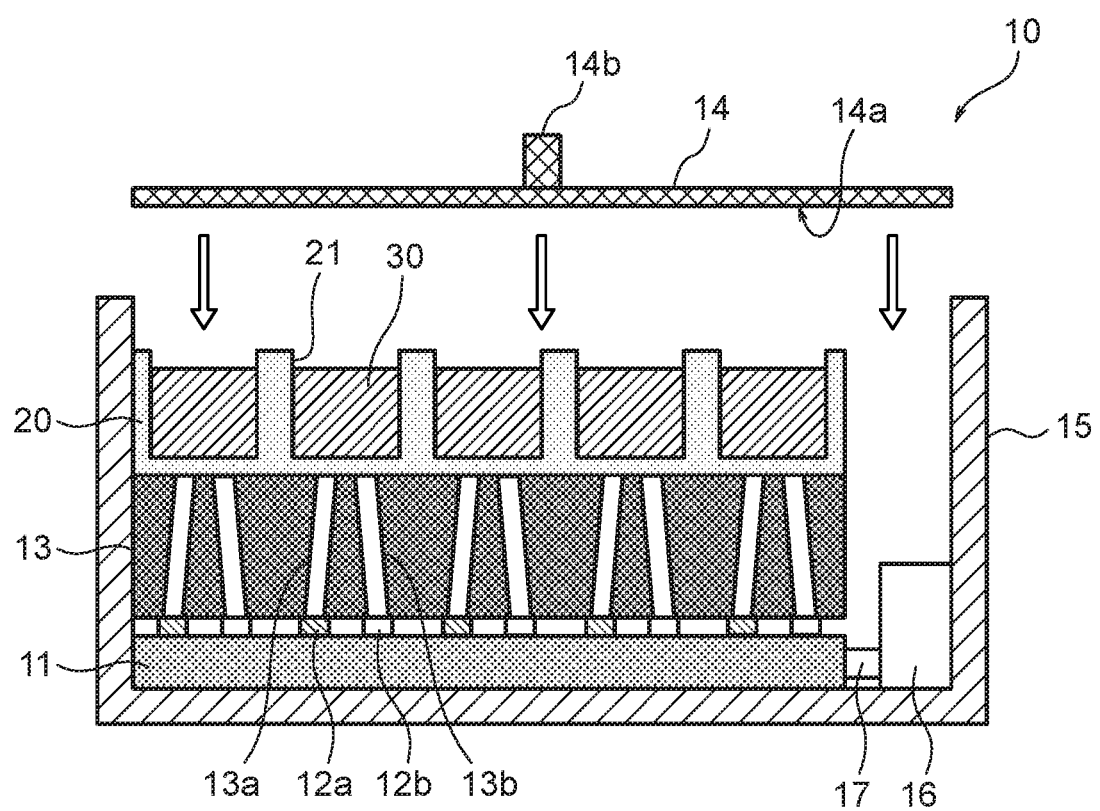
FIG. 8 is a diagram for explaining a setting method of the microplate reader.

Next, as shown in FIG. 8, the operator deploys the mirror plate 14 on the microplate 20. At this time, the operator holds a handle 14b of the mirror plate 14, which is provided on the surface opposite to the reflecting surface 14a, and places the mirror plate 14 on the microplate 20 to close the opening of the housing 15. The mirror plate 14 may be positioned in the vertical direction by a positioning member (not shown).

After deploying the mirror plate 14 above the microplate 20, the operator manipulates a power switch (not shown), etc. to supply electric power from the power source unit 16 to the light sources 12a and the light receiving sensors 12b via the power feeding cable 17. Accordingly, light is emitted from each light source 12a.

The light emitted from each light source 12a passes through the corresponding projecting-light guide path 13a in the light guide plate part 13 and through the sample 30 stored in the corresponding well 21 in the microplate 20, and reaches the mirror plate 14. Then, the light that has reached the mirror plate 14 is reflected by the reflecting surface 14a of the mirror plate 14 and passes through the wells 21 again. The light that has passed through each well 21 passes through the corresponding receiving-light guide path 13b in the light guide plate part 13 and is received by the corresponding light receiving sensor 12b. In this way, optical characteristics (for example, light absorption characteristics) of the samples 30 are measured.

The measurement results by the light receiving sensors 12b may be transmitted as light intensity information to an external device via a data communication unit (not shown). In this case, the external device determines the optical characteristics of the samples 30 on the basis of the light intensity information.

As described above, the microplate reader 10 according to the present embodiment includes the light projecting/receiving units, each including a light source 12a and a light receiving sensor 12b corresponding to a well 21 of the microplate 20, that are located below the microplate 20 oriented horizontally, the number of the light projecting/receiving units being the same as the number of the wells 21 in the microplate 20. The microplate reader 10 also includes the mirror plate 14 that is located above the microplate 20 and that reflects light having passed through the samples 30 stored in the wells 21 from the light projecting/receiving units to the light projecting/receiving units. In addition, the microplate reader 10 includes the light guide plate part 13 located between the light projecting/receiving units and the microplate 20, the light guide plate part 13 including the projecting-light guide paths 13a for guiding the light emitted from the light sources 12a to the samples 30, the receiving-light guide paths 13b for guiding the light that has been reflected by the mirror plate 14 and has passed through the samples 30 to the light receiving sensors 12b, and the surrounding member 13c containing a pigment-containing resin surrounding the projecting-light guide paths 13a and the receiving-light guide paths 13b.

Thus, in the microplate reader 10 in this embodiment, the light sources 12a for irradiating the samples 30 stored in the wells 21 with light and the light receiving sensors 12b for measuring the light having exited from the samples 30 are provided, the light sources 12a and the light receiving sensors 12b corresponding to all the wells 21 in the microplate 20.

Conventionally, there has been no concept of providing light sources and light receiving sensors corresponding to all the wells 21 in the microplate 20. Instead, the microplate 20 was traversed at each optical measurement step for a single well 21, and the entire optical measurement for all the wells 21 was completed by multiple traverses of the microplate 20, and it took a long time.

In the present embodiment, the entire optical measurement for all the samples 30 stored in the wells 21 in the microplate 20 is performed substantially simultaneously without scanning the microplate 20 for each optical measurement step as in the prior art. Therefore, the measurement time can be shortened. In addition, since a complicated drive mechanism for scanning the microplate 20 is unnecessary, the size of the device can be reduced.

In addition, the microplate reader 10 includes the mirror plate 14 that reflects the light emitted from the light sources 12a irradiating the samples 30 stored in the wells 21 and having passed through the samples 30, the mirror plate 14 causing the light to pass through the wells 21 again toward the light receiving sensors 12b. Therefore, the light source 12a and the light receiving sensor 12b can be arranged side by side below the microplate 20, so that the entire thickness of the light guide part can be shortened in comparison with a case in which light projecting units and light receiving units are arranged to face one another in vertical directions with the microplate 20 interposed therebetween.

Furthermore, in the case in which the light projecting units and the light receiving units are arranged to face one another in vertical directions with the microplate 20 interposed therebetween, power supply wiring boards (printed circuit boards) are necessary above and below the microplate 20, respectively. However, in the present embodiment, it is only necessary to provide a wiring board on one side of the microplate 20 by virtue of the mirror plate 14.

Therefore, it is possible to reduce the size of the device.

In the light guide plate part 13, the projecting-light guide paths 13a for introducing the light to the wells 21 in the microplate 20 and the receiving-light guide paths 13b for introducing the light from the wells 21 to the light receiving sensors 12b are formed of a transparent resin (silicone resin), and the light guide paths 13a and 13b are surrounded by the surrounding member 13c made of a pigment-containing resin capable of absorbing external light and scattered light. Therefore, it is possible to minimize the influence of light noise (stray light) derived from the external light and scattered light.

In particular, by using the same material for the transparent resin and the pigment-containing resin, reflection and scattering at the interface between the two resins can be appropriately reduced. That is, stray light having entered the pigment-containing resin is absorbed by the pigment-containing resin, and is unlikely to return to the light guide paths, so that complicated multiple reflection of stray light is unlikely to occur. Furthermore, the influence of external light can be remarkably reduced by appropriately defining the cross-sectional areas and light route lengths of the light guide paths 13a and 13b.

That is, even if external light enters the inside of the device, the influence of external light is significantly attenuated in each of the light guide paths 13a and 13b in the light guide plate part 13. Therefore, it is not necessary to strictly take countermeasures against light noise for the optical system inside the microplate reader, and the device need not be large to accommodate the countermeasures against the light noise.

The above-described monolithic optical system technology using silicone resin is referred to as SOT (Silicone Optical Technology). In this embodiment, by adopting the SOT structure in the optical system of the microplate reader, it is possible to nearly ignore the influence of external light (light noise), realizing reduction in size of the device and high-precision optical measurement in the microplate reader.

The microplate reader 10 includes a housing 15 within which the microplate 20 is located. The housing 15 can be made of, for example, a material having a light shielding property and a heat insulating property. In this case, the influence of external light that is on the point of entering from the side surface of the microplate 20 and the influence of temperature can be reduced. Therefore, the reliability of the measurement data obtained from the wells 21 located at edges of the microplate 20 can be ensured.

As described above, the microplate reader 10 in the present embodiment can be miniaturized so as to be portable and suitable for POCT, etc., and can perform optical measurement on all the samples 30 stored in the wells 21 in the microplate 20 in a short time with high accuracy.

Figure 9:
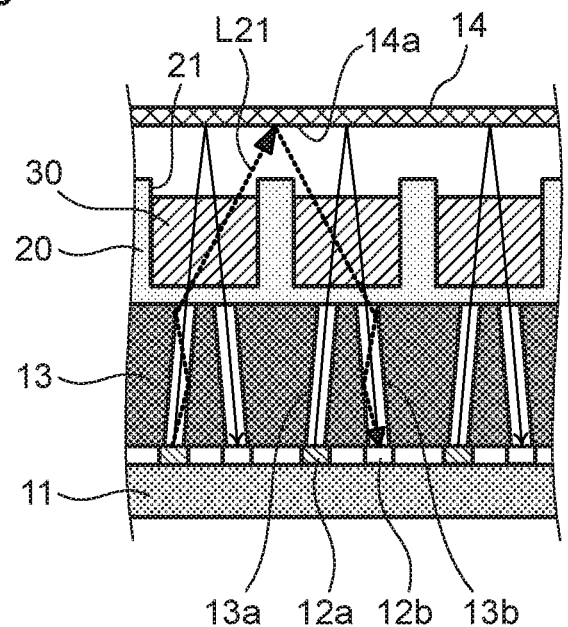
FIG. 9 is a diagram for explaining influence of external light.

Although the influence of external light (light noise) can be nearly ignored by the structure of the light guide plate part 13 described above, further countermeasures against light noise may be taken. For example, as shown in FIG. 9, let us assume that a light component L21 that is not straight light has passed through a projecting-light guide path 13a and through a well 21 and reaches the reflecting surface 14a of the mirror plate 14. In this case, part of the light component L21 may enter the adjacent well 21 and pass through the corresponding receiving-light guide path 13b to reach the corresponding light receiving sensor 12b as light noise. When the intensity of the light (signal light) emitted from the light source 12a is small, even weak light noise is likely to adversely affect the measurement result, and therefore, it is necessary to reduce the influence of such light noise.

Figure 10:
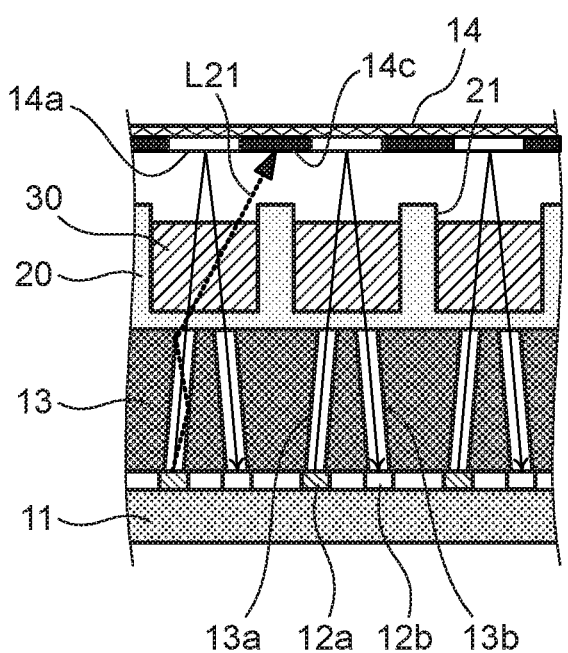
FIG. 10 is a diagram illustrating another example of the mirror plate.

In this case, it is suitable that the regions of the reflecting surface 14a of the mirror plate 14 be limited so that light that has passed through each well 21 enters only the same wells 21 again. FIG. 10 is an example of a mirror plate 14 in which the regions of the reflecting surface 14a are limited.

Figure 11:
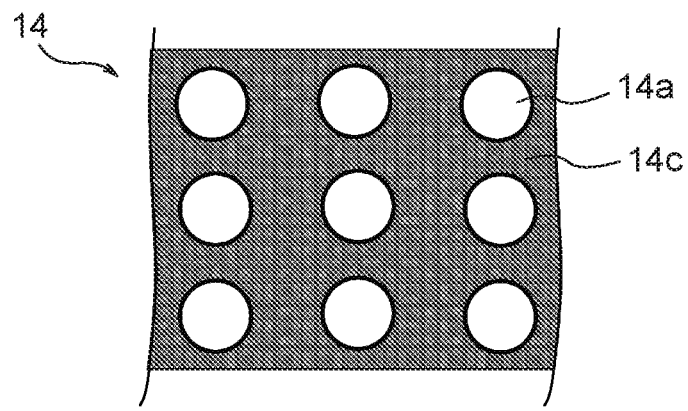
FIG. 11 is a diagram illustrating another example of the mirror plate.

In FIG. 10, reflecting surfaces 14a of the mirror plate 14 are limited to above the wells 21 in the microplate 20, and the periphery of the reflecting surfaces 14a is a non-reflecting surface 14c. The shape of the reflecting surfaces 14a is circular as shown in FIG. 11, for example. When the reflecting surfaces 14a are circular, the reflecting surfaces 14a of the mirror plate 14 are arranged substantially concentric to the wells 21.

Thus, on the surface of the mirror plate 14 facing the microplate 20, the reflecting surfaces 14a can be selectively provided depending on the positions of the light guide paths 13a and 13b. By restricting the reflecting surfaces 14a as described above, it is possible to prevent part of the light that has passed through a well 21 and reached the mirror plate 14 from entering another well 21 neighboring the original well 21. Therefore, a highly accurate measurement result can be obtained.

As described above, the microplate reader 10 in the present embodiment can acquire measurement data for all the wells 21 in the microplate 20 almost simultaneously. However, the measurement data processing is not necessarily performed at the same time for all the wells. For example, data processing may be performed for eight wells, and this may be performed twelve times. In this case, a data processing time is taken to some extent.

Accordingly, the microplate reader 10 may have a configuration capable of simultaneously processing the measurement data for each well 21 at once.

Figure 12:
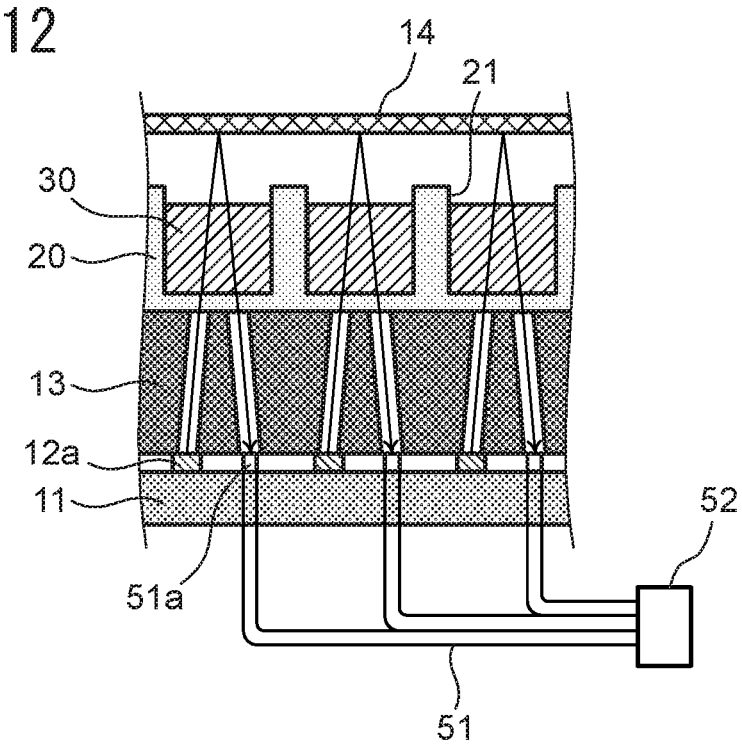
FIG. 12 is a diagram showing a configuration for processing measurement data simultaneously.

In this case, as shown in FIG. 12, the microplate reader 10 may have a configuration in which light emitted from the samples 30 stored in the wells 21 and guided by the receiving-light guide paths 13b is received by the optical fibers 51. That is, as the light receiving units, ends (light entrance ends) 51a of the optical fibers 51 may be disposed instead of the light receiving sensors 12b.

The optical fibers 51 that receive light having passed through the receiving-light guide paths 13b for the wells 21 can be bundled on the side of the light exit ends. Light having exited from the optical fiber bundle, in which the optical fibers 51 are bundled, can be captured by an image sensor 52. The image data captured by the image sensor 52 is optical measurement data corresponding to all the wells 21 in the microplate 20. By arithmetically processing the image data, it is possible to simultaneously process the light measurement data corresponding to all the wells 21 at once.

In the present embodiment, the microplate reader 10 includes a structure in which the light guide plate part 13 is located above the light projecting/receiving units having the light sources 12a and the receiving-light guide paths 13b, the microplate 20 is located above the light guide plate part 13, and the mirror plate is located above the microplate 20. In other words, the above-described microplate reader 10 includes a structure that irradiates light from below the wells 21 in the microplate 20, causes the light having passed through the wells 21 to reflect at the position above the wells 21 to pass through the wells 21 again, and receives the light on the bottom side of the wells 21.

However, the structure may be modified such that light is irradiated from above the wells 21 in the microplate 20, the light having passed through the wells 21 is reflected on the bottom surface side of the wells 21 and is caused to pass through the wells 21 again to be received above the wells 21. However, as described above, the structure in which light is irradiated from the bottom surface side of the well 21 in the microplate 20 is preferable because setting of the microplate 20 is easy.

Second Embodiment

Next, a second embodiment of the present invention will be described.

In the first embodiment, the microplate reader can deal with a microplate having a predetermined number of wells (96 wells). In the second embodiment, a microplate reader can deal with microplates having different numbers of wells.

For example, when cells are cultured in a microplate and are optically measured, a microplate having a small number of wells (for example, 6 wells) is used. In order to deal with such different types of microplates, in this embodiment, units (microplate reader units) each corresponding to only one well, are used.

Figure 13:
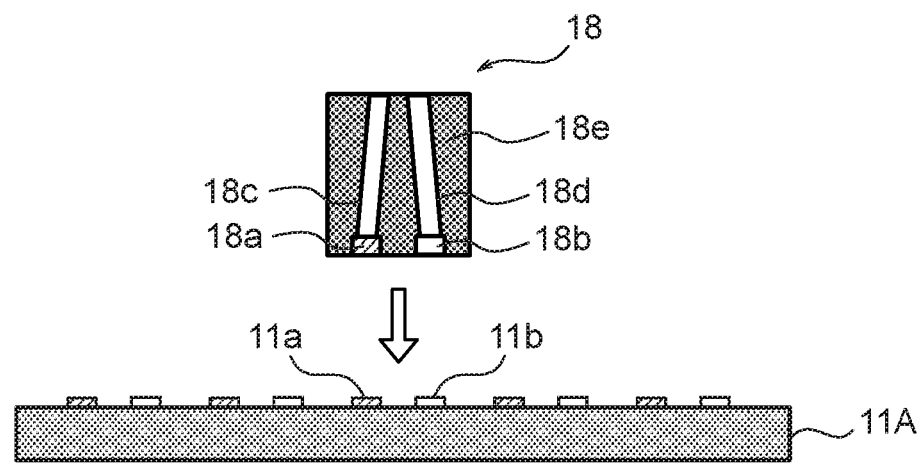
FIG. 13 is a diagram showing a configuration of a microplate reader unit.

FIG. 13 is a diagram illustrating an example of a configuration of the microplate reader unit 18.

As shown in FIG. 13, the microplate reader unit 18 includes a light source 18a, a light receiving sensor 18b, a projecting-light guide path 18c, a receiving-light guide path 18d, and a surrounding member 18e. The light source 18a and the light receiving sensor 18b are the same as the light source 12a and the light receiving sensor 12b forming the light projecting/receiving unit in the first embodiment described above. The projecting-light guide path 18c, the receiving-light guide path 18d, and the surrounding member 18e are the same as the projecting-light guide path 13a, the receiving-light guide path 13b, and the surrounding member 13c forming the light guide plate part 13 in the first embodiment described above.

The microplate reader unit 18 is configured to be attachable to and detachable from a substrate 11A. The substrate 11A includes connector portions 11a and 11b on the obverse surface that is similar to that of the substrate 11 of the first embodiment, each of the connector portions 11a being connected to the power supply circuit on the substrate and capable of being connected to the light source 18a, each of the connector portions 11b being connected to the power supply and capable of being connected to the light receiving sensor 18b.

For example, 96 connector portions 11a and 96 connector portions 11b are provided on the substrate 11A so as to be arranged at positions corresponding to the wells of a 96-well microplate. Specifically, the connector portions 11a and 11b are provided on the substrate 11A at positions corresponding to, for example, the light sources 12a and the light receiving sensors 12b shown in FIG. 2. The microplate reader unit 18 has a size corresponding to one well of the 96-well microplate. At most 96 microplate readers 18 can be mounted on the substrate 11A corresponding to the wells of the 96-well microplate.

Figure 14:
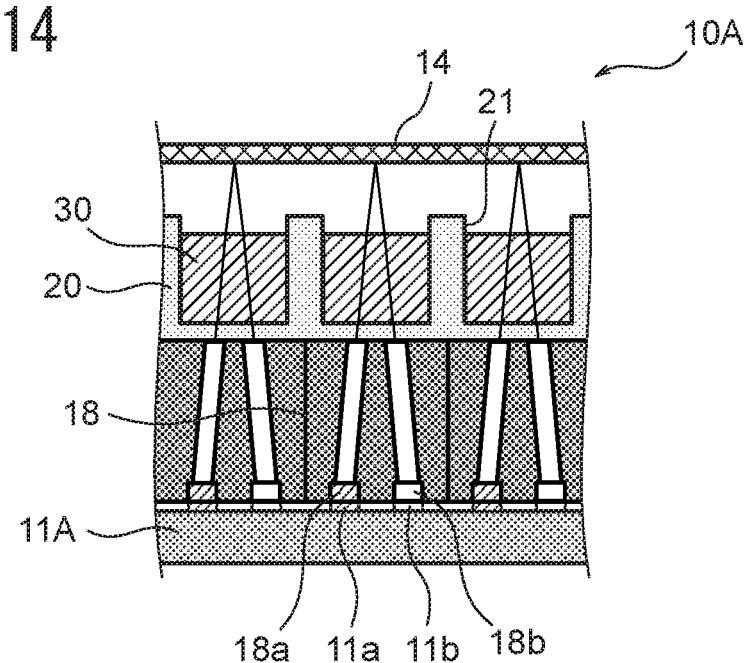
FIG. 14 is a diagram of an example of arrangement of microplate reader units.

FIG. 14 is a view showing an example of a microplate reader 10A in the present embodiment, and is a view when multiple microplate reader units 18 are mounted on the substrate 11A and are located neighboring one another. As shown in FIG. 14, the structure in which multiple microplate reader units 18 are connected to the substrate 11A is similar to the structure of a part of the microplate reader 10 (substrate 11, light sources 12a, light receiving sensors 12b, and the light guide plate part 13) in the first embodiment shown in FIG. 1.

Accordingly, the microplate reader 10A in which 96 microplate reader units 18 are connected to the substrate 11A has the same structure as the microplate reader 10 in the first embodiment shown in FIG. 1.

The microplate reader 10A in the present embodiment is configured by appropriately arranging multiple microplate reader units 18 depending on the number and positions of the wells 21 in the microplate 20 used for optical measurement.

Figure 15:
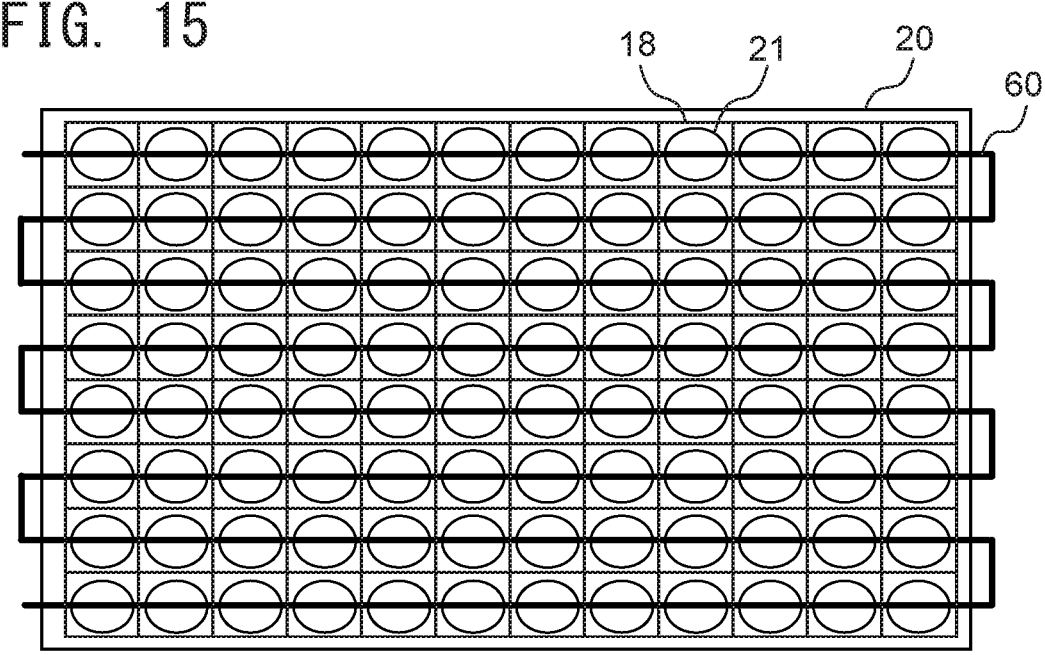
FIG. 15 is a diagram of an example of measurement for a 96-well microplate.

For example, when a 96-well microplate 20 is used, as shown in FIG. 15, 96 microplate reader units 18 are arranged at positions corresponding to the 96 wells 21, respectively. The 96 microplate reader units 18 are connected to the wiring 60 formed on the substrate 11A so as to be supplied with power from the wiring 60. The connection scheme for the wiring 60 can be a multidrop connection or a daisy chain connection.

Figure 16:
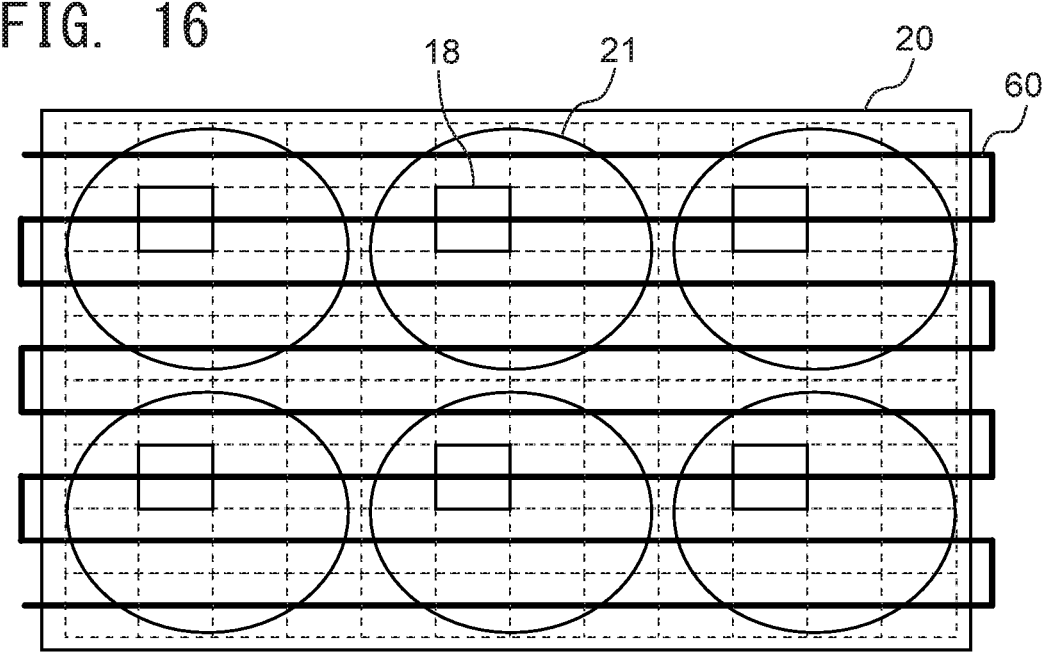
FIG. 16 is a diagram of an example of measurement for a 6-well microplate.

On the other hand, when a 6-well microplate 20 is used, as shown in FIG. 16, six microplate reader units 18 are arranged at positions corresponding to the six wells 21, respectively. Also, in this case, the six microplate reader units 18 are connected to the wiring 60 formed on the substrate 11A so as to be supplied with power from the wiring 60.

In FIG. 16, one microplate reader unit 18 is arranged for one well 21, but multiple microplate reader units 18 may be arranged for one well 21. In the latter case, a statistic of measurement values obtained from multiple microplate reader units 18 corresponding to a well 21 may be adopted as a measurement value for the well 21.

As described above, the microplate reader 10A according to the present embodiment may include a necessary number of microplate reader units 18 that are arranged at necessary positions on the substrate 11A depending on the number and positions of the wells 21 in the microplate 20. Therefore, the microplate reader can be configured corresponding to microplates 20 having different numbers of wells.

In the present embodiment, the microplate reader unit 18 includes the light projecting/receiving unit and the light guide plate part. However, the microplate reader unit 18 may also include a substrate having wirings connected respectively to the light source 18a and the light receiving sensor 18b forming the light projecting/receiving unit. In this case, it is preferable that the substrate of the unit can be connected to a power feeding cable connected to the power source unit when the microplate reader units 18 are arranged corresponding to the number and positions of the wells 21 in the microplate 20.

Third Embodiment

Next, a third embodiment of the present invention will be described.

In the first embodiment described above, the optical axes of the projecting-light guide paths 13a and the optical axes of the receiving-light guide paths 13b are inclined at angles with respect to the normal direction. In the third embodiment, the optical axes of the projecting-light guide paths 13a and the optical axes of the receiving-light guide paths 13b are in parallel to the normal direction.

When the light guide plate part 13 is manufactured, first, the surrounding member 13c made of a pigment-containing resin is formed so as to have cavities corresponding to the projecting-light guide paths 13a and the receiving-light guide paths 13b. Thereafter, a resin (for example, silicone resin) that is transparent to the light emitted from the light sources 12a is supplied into the cavities corresponding to the projecting-light guide paths 13a and the receiving-light guide paths 13b.

At this time, if the angles formed between the central axes of the cavities corresponding to the projecting-light guide paths 13a and the receiving-light guide paths 13b (corresponding to the optical axes of the projecting-light guide paths 13a and the receiving-light guide paths 13b) and the normal directions are not 0 degrees, it is difficult to form the surrounding member 13c.

Accordingly, in the present embodiment, the angle between the optical axis of each projecting-light guide path 13a in the light guide plate part 13 and the normal direction and the angle between the optical axis of each receiving-light guide path 13b in the light guide plate part 13 and the normal direction are 0 degrees or almost 0 degrees.

Figure 17:
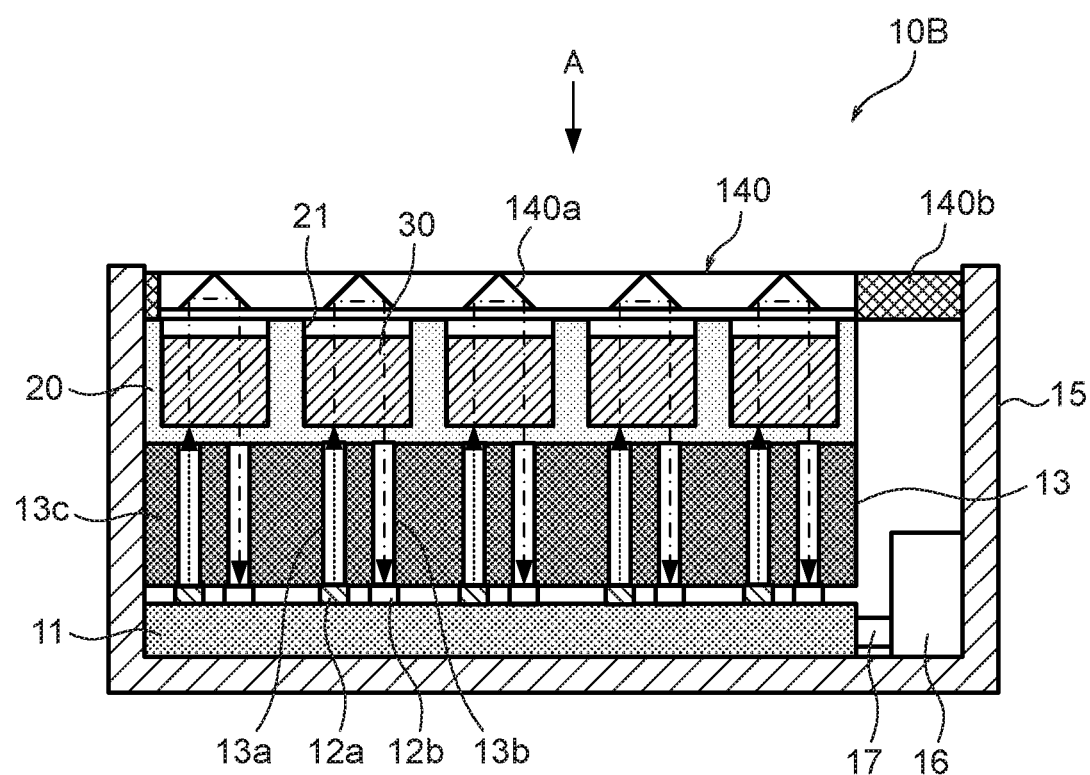
FIG. 17 is a diagram of a schematic configuration diagram of a microplate reader according to a third embodiment.

FIG. 17 is a schematic configuration diagram of a microplate reader 10B according to the third embodiment.

The microplate reader 10B includes a substrate 11, multiple light sources 12a, multiple light receiving sensors 12b, a light guide plate part (light guide part) 13, a prism type reflection member (reflection member) 140, a housing 15, a power source unit 16, and a power feeding cable 17.

The microplate reader 10B has the same structure as that of the microplate reader 10 in the first embodiment, except for the configurations of the light guide plate part 13 and the reflection member (mirror plate 14 in the first embodiment). Accordingly, the following description will focus on parts that differ from the microplate reader 10.

The light guide plate part 13 is different from that of the microplate reader 10 in the first embodiment in that the angle between each projecting-light guide path 13a and the normal direction and the angle between each receiving-light guide path 13b and the normal direction. Specifically, in the light guide plate part 13, the angle between each projecting-light guide path 13a and the normal direction and the angle between each receiving-light guide path 13b and the normal direction are 0 degrees. That is, the angle between the optical axis of each projecting-light guide paths 13a and the perpendicular direction for the microplate 20 is 0 degrees, whereas the angle between the optical axis of each receiving-light guide paths 13b and the perpendicular direction for the microplate 20 is 0 degrees.

In addition, the microplate reader 10B includes a prism-type reflection member 140 as a reflection member. The prism type reflection member 140 is disposed above the microplate 20 located above the light guide plate part 13. The surface of the prism type reflection member 140 facing the microplate 20 has a light return facilitating structure. The prism type reflection member (reflection member) 140 closes the opening of the housing 15 and functions as an upper lid of the microplate 20.

Prism-Type Reflection Member

When the vertical direction in FIG. 17 is defined as the normal direction for the mirror plate 14, similar to in FIG. 1, the angle between the optical axis of each projecting-light guide path 13a and the normal direction and the angle between the optical axis of each receiving-light guide path 13b and the normal direction are 0 degrees. The normal direction is a vertical direction orthogonal to the horizontal plane.

The prism-type reflection member 140 is an optical element having an optical function to return the light that is emitted from the light sources 12a and has exited from the projecting-light guide paths 13a and that travels upward, 180 degrees for causing it to travel downward to be received by the light receiving sensors 12b via the receiving-light guide paths 13b.

The prism type reflection member 140 includes multiple prisms 140a and a prism holding frame 140b that holds the multiple prisms 140a.

Figure 18:
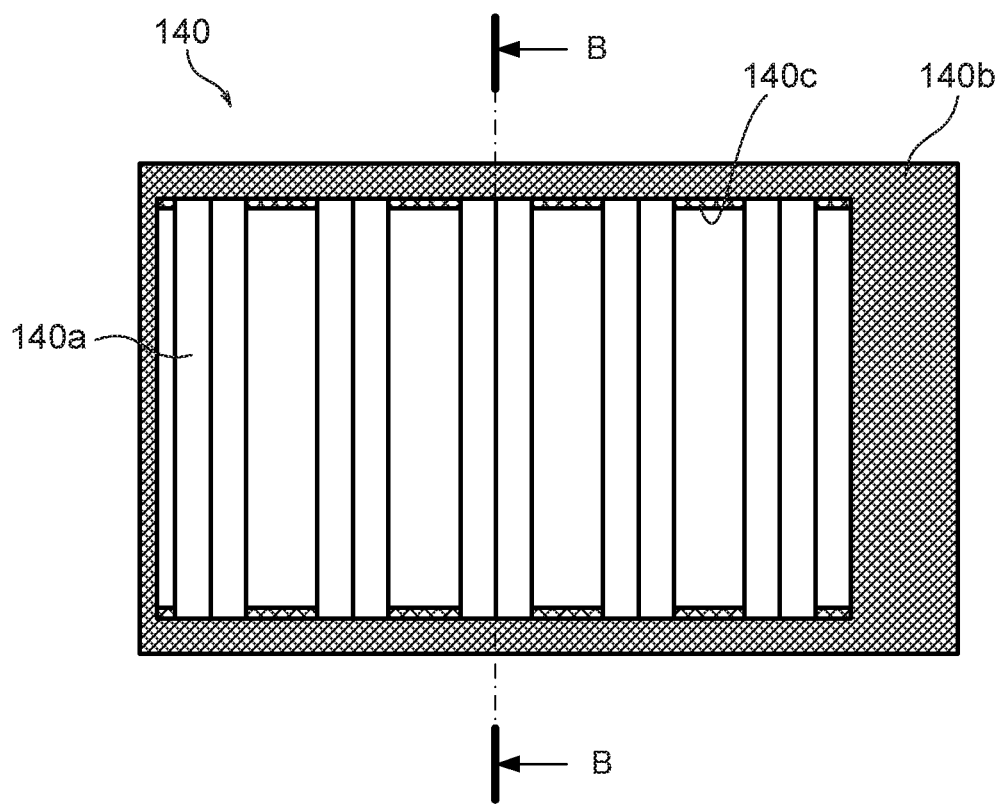
FIG. 18 is a top view of the microplate reader.

As shown in FIG. 17 and FIG. 18, which is a seen in the direction of arrow A in FIG. 17, each prism 140a is a right-angle prism and has a triangular prism structure. The prism 140a can be made of glass, cyclic olefin resin, etc. The prism 140a is disposed above the well 21 in such an orientation that the right angle apex is oriented upward.

The prisms 140a correspond to the multiple wells 21 in the microplate 20, respectively, and the longitudinal direction of each prism 140a is aligned with the direction of a row or a column of the wells of the microplate 20. For example, if the number of wells 21 in the microplate 20 is 96 and if 12 columns of wells are arranged in 8 rows, the longitudinal direction of each prism 140a corresponds to the direction of a column having 8 wells or a column having 12 wells. That is, each prism 140a corresponds to 8 wells or 12 wells.

The prism holding frame 140b has quadrangular cavities corresponding to the size of the microplate 20, and multiple prisms 140a are arranged in the cavities. Among the walls surrounding each rectangular cavity, two opposite walls at both ends of the prism 140a have prism support portions 140c that protrude inward by a predetermined length.

Figure 19:
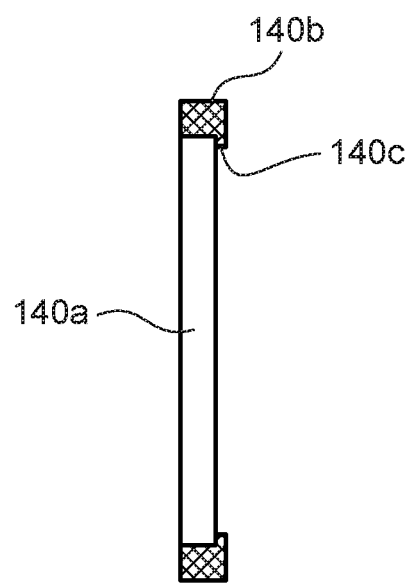
FIG. 19 is a cross-sectional view taken along line B-B in FIG. 18.

As shown in FIG. 19, which is a cross-sectional view taken along line B-B in FIG. 18, the prism support portions 140c are provided at the lower ends of the two walls in the prism holding frame 140b. Each prism 140a is supported by the prism support portions 140c by placing parts of both ends of the prism 140a in the longitudinal direction on the prism support portions 140c. Each prism 140a is arranged above the corresponding wells.

The protruding length of the prism support portions 140c is defined so that the prism support portions 140c do not block the light exiting from the wells 21 and the light that is returned by the prism type reflection member 140 and that is to enter into the wells 21.

The surface (bottom surface) of the prism 140a of the prism type reflection member 140 facing the microplate 20 is a flat surface. As shown in FIG. 17, the light entering to the prism 140a through the flat surface (bottom surface) of the prism 140a is totally reflected by the two inclined surfaces that form the right angle apex, and as a result, it is returned 180 degrees to exit from the prism 140a. The optical axis of the light entering the prism 140a and the optical axis of the returned light returned 180 degrees by the prism 140 and having exited from the prism 140a are spaced apart from each other at a predetermined interval.

As described above, the prism type reflection member 140 includes multiple prisms 140a, each of which is a right-angle prism having two reflecting surfaces forming an apex angle of 90 degrees. Among the two reflecting surfaces, one reflecting surface forms an angle of 45 degrees with respect to the vertical direction, and the other reflecting surface forms an angle of −45 degrees with respect to the vertical direction. The two reflecting surfaces extend along the alignment direction (direction of a row or a column) of the wells 21.

Therefore, when the light emitted from each light source 12a, having passed through the corresponding projecting-light guide path 13a of the light guide plate part 13 and through the sample 30 stored in the corresponding well 21 in the microplate 20 reaches the corresponding prism 140a of the prism type reflection member 140, the light enters the prism 140a of the prism type reflection member 140 through the flat surface (bottom surface) thereof and is returned 180 degrees to exit through the flat surface (bottom surface). Then, the light having exited from the prism 140a of the prism type reflection member 140 passes again through the sample 30 stored in the well 21 in the microplate 20 and through the receiving-light guide path 13b of the light guide plate part 13, and enters the corresponding light receiving sensor 12b.

Figure 20:
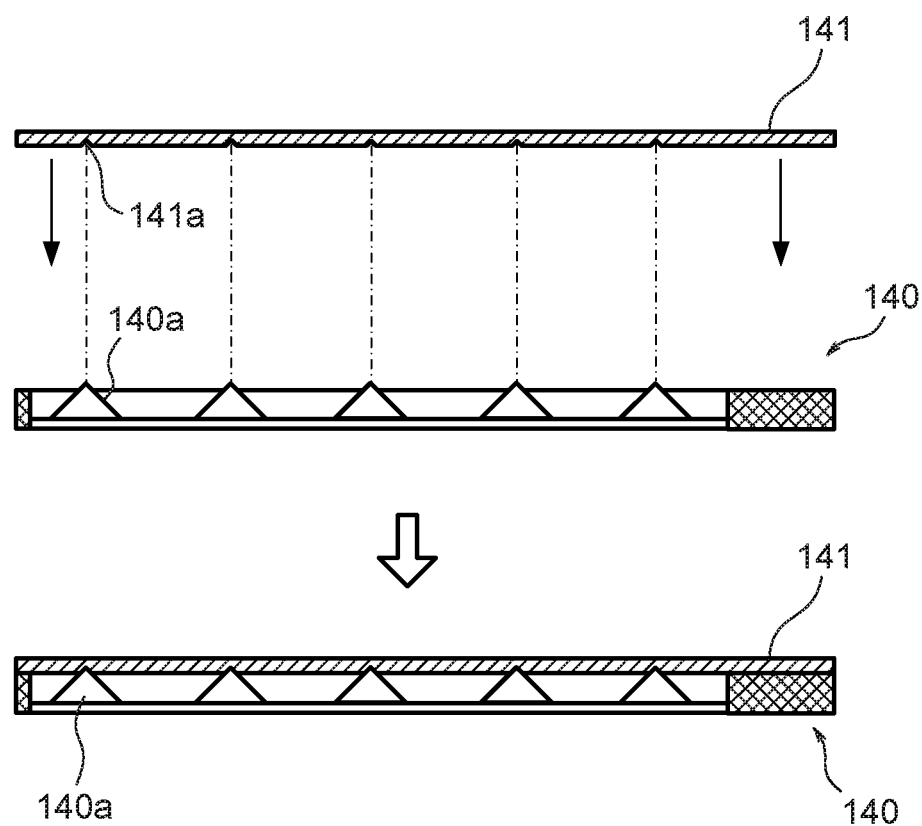
FIG. 20 is a diagram of an example of a configuration of a reflection member having a prism positioning member.

As shown in FIG. 20, the prism type reflection member 140 may include a flat prism positioning member 141 for positioning the prisms 140a at predetermined positions in the cavities of the prism holding frame 140b. The prism positioning member 141 includes prism positioning portions 141a, each of which is a wedge-shaped recess corresponding to the apex angle of the prism 140a, and extends linearly along the longitudinal direction of the corresponding prism 140a.

Each prism 140a is positioned at a predetermined position by disposing the prism positioning member 141 above the prism type reflection member 140 and disposing the apex angle of the prism 140a in the prism positioning portion 141a.

In this manner, each prism 140a is positioned so that the apex position thereof is aligned with the center position between the optical axes of the projecting-light guide path 13a and of the light guide path 13b of the light guide plate part 13. Accordingly, the light emitted from each light source 12a, having passed through the corresponding projecting-light guide path 13a of the light guide plate part 13 and through the sample 30 stored in the corresponding well 21 in the microplate 20, and returned 180 degrees by the corresponding prism 140a can pass through the sample 30 stored in the corresponding well 21 in the microplate 20 again and the corresponding receiving-light guide path 13b of the light guide plate part 13 appropriately for entering the corresponding light receiving sensors 12b.

Figure 21:
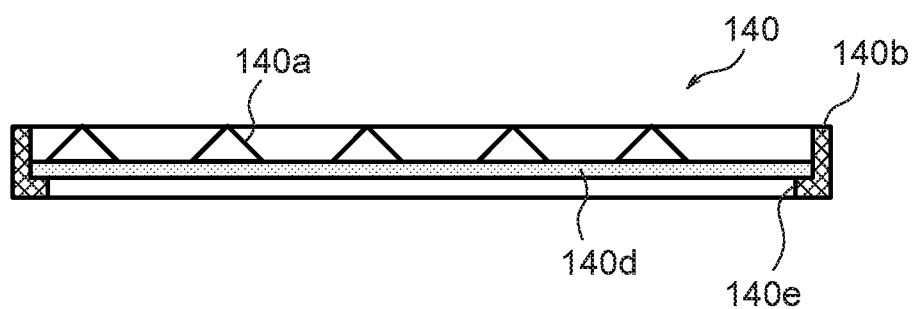
FIG. 21 is a diagram of an example of a configuration of a reflection member having a light transmissive plate.

As shown in FIG. 21, the prisms 140a may be placed on a light transmissive plate 140d that is for example, a glass plate, rather than the prism support portions 140c of the prism holding frame 140b. The light transmissive plate 140d can be supported by, for example, light transmissive plate support portions 140e that protrude inward by a predetermined length from walls surrounding the cavity of the prism holding frame 140b. Thus, by providing the light transmissive plate 140d, an effect of preventing the prisms 140a from being contaminated can be obtained.

Figure 22:
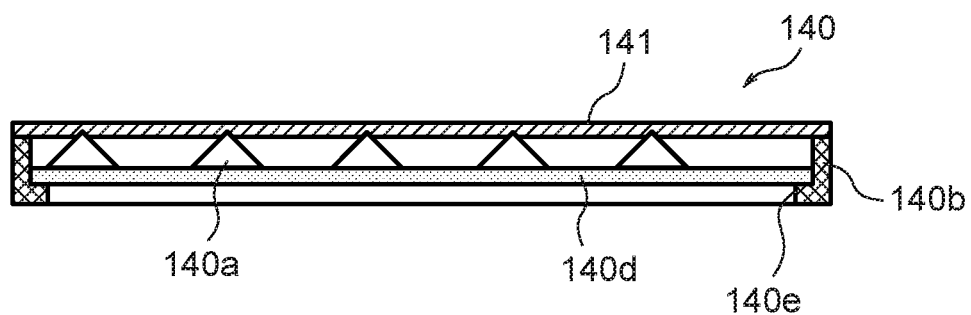
FIG. 22 is a diagram of an example of a configuration of a reflection member having a light transmissive plate and a prism positioning member.

Even in the structure having the light transmissive plate 140d, the prism positioning member 141 can be used as shown in FIG. 22 in order to position the prisms 140a at predetermined positions.

Modification of Third Embodiment

Figure 23:
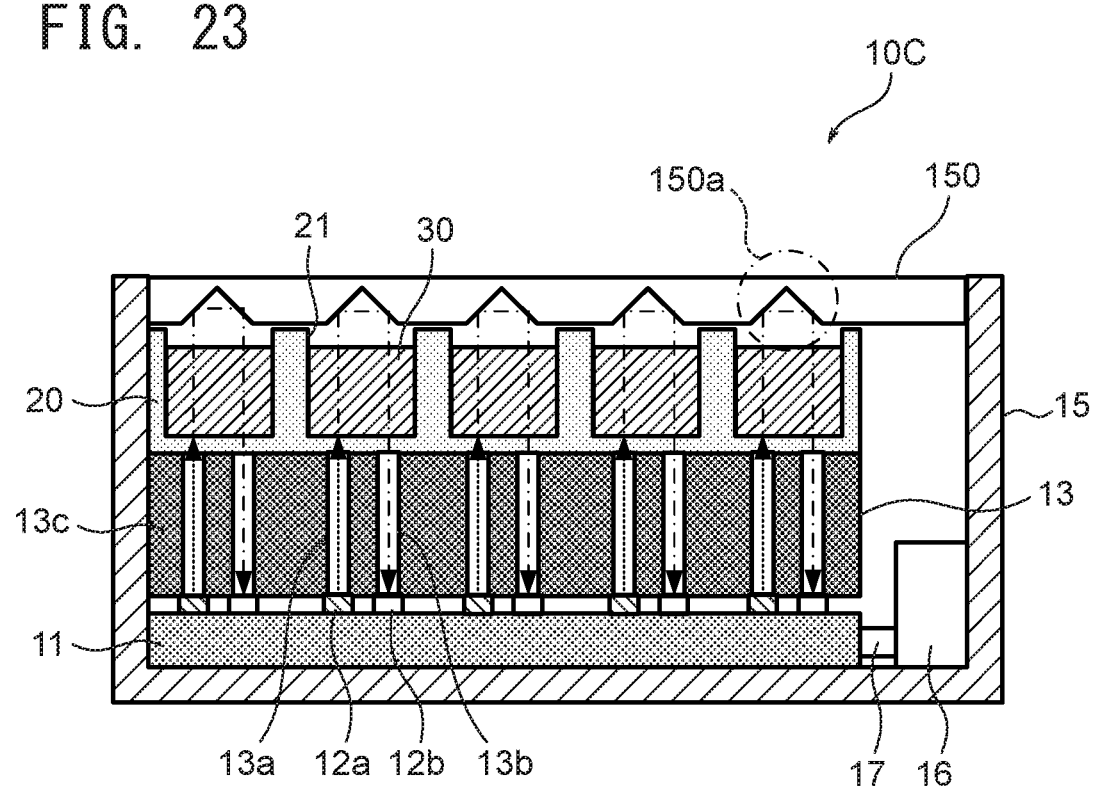
FIG. 23 is a diagram of a microplate reader according to a modification of a third embodiment.

FIG. 23 is a schematic configuration diagram of a microplate reader 10C according to a modification of the third embodiment. In this modification, a light returning member 150 is used, as a reflection member, instead of the prism type reflection member 140. The reflection member has a function for returning the light from the light source 12a having exited from the projecting-light guide path 13a and traveling upward, at 180 degrees for traveling downward, and for causing it to be received by the light receiving sensor 12b via the receiving-light guide path 13b.

The microplate reader 10C shown in FIG. 23 has the same structure as that of the microplate reader 10B shown in FIG. 17, except for the light returning member 150. Accordingly, the following description will focus on parts that differ from the microplate reader 10B.

The light returning member 150 is a plate member made of synthetic resin or metal. On the lower surface of the light returning member 150, there are provided light returning portions 150c. Each of the light returning portions 150c is a wedge-shaped recess having a right angle apex, faces the wells 21 in the microplate 20, and extends linearly along the alignment direction (direction of a row or a column) of the wells 21. The light returning member 150 is positioned so that the apex position of each light returning portion 150a is aligned with the center position between the optical axes of the projecting-light guide path 13a and of the receiving-light guide path 13b of the light guide plate part 13.

Figure 24:
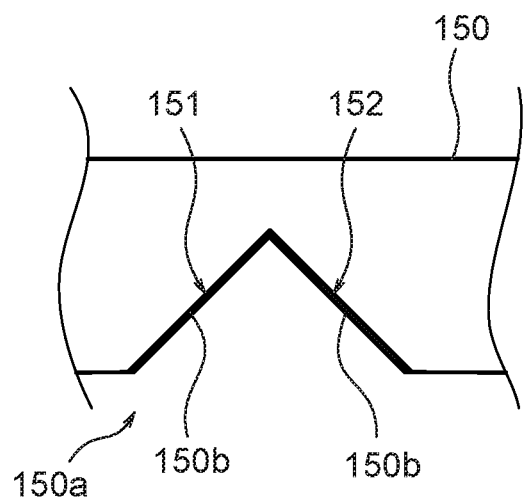
FIG. 24 is a diagram illustrating a configuration of a light returning portion.

As shown in FIG. 24, each light returning portion 150a includes a first inclined surface 151 that forms an angle of 45 degrees with respect to the normal direction and a second inclined surface 152 that forms an angle of −45 degrees with respect to the normal direction. Each of the first inclined surface 151 and the second inclined surface 152 is a reflecting surface having a light reflecting coating portion 150b provided on the surface thereof. The light reflecting coating portions 150b are made of, for example, an aluminum thin film, and are applied to the first inclined surface 151 and the second inclined surface 152 by a technique such as plating.

Thus, the light traveling in the normal direction and incident on one of the first inclined surface 151 and the second inclined surface 152 is reflected 90 degrees and is incident on the other inclined surface, and is reflected 90 degrees again by the other inclined surface 90. In this way, in a manner similar to the prism-type reflection member 140 shown in FIG. 17, the light returning member 150 returns the light from the light source 12a having exited from the projecting-light guide path 13a and traveling upward, at 180 degrees for traveling downward.

However, the light returning member 150 may deteriorate due to oxidation, etc. in the light reflection coating portions 150b during a long-term use, and reflectance may decrease. Therefore, the light returning member 150 must be appropriately replaced, depending on the degree of deterioration.

On the other hand, since the prism-type reflection member 140 described above uses prisms 140a made of glass or light-transmitting synthetic resin, it is not necessary to provide the light-reflecting coating portions 150b for reflecting light. Therefore, the prism-type reflection member 140 does not need to be replaced due to deterioration of the light reflecting coating portions 150b as in the light returning member 150.

Other Embodiments

The reflection member that turns light 180 degrees is not limited to the prism-type reflection member 140 or the light turning member 150 described above. For example, the reflection member may be a scattering plate that has a flat plate shape similar to the mirror plate 14 of the first embodiment, and the surface of the scattering plate facing the microplate 20 is a scattering surface. If this scattering plate is used, the intensity of the reflected light is remarkably reduced, but the alignment performed for the prism type reflection member 140 or the light returning member 150 described above can be made unnecessary.

Alternatively, the reflection member may use, for example, retroreflector type optical elements (for example, corner cube reflectors) each of which uses three reflections. In using prism type reflection members 140, in some cases, it is necessary to align not only the positions but also the angle orientation of the inclined surfaces (reflecting surfaces) with respect to the entering light. However, in using the retroreflector type optical elements, only the position alignment is needed.

In addition, in the second embodiment, in order that the angle between the optical axis of each projecting-light guide path 18c of the microplate reader unit 18 and the normal direction and the angle between the optical axis of the receiving-light guide path 18d of the microplate reader unit 18 and the normal direction be 0 degrees, the prism type reflection member 140 of the third embodiment, the light returning member 150, the scattering plate, or the above-mentioned retroreflector type optical elements may be applied in the microplate reader unit 18.

MODIFICATIONS

In the above-described embodiments, the projecting-light guide paths (13a, 18c) and the receiving-light guide paths (13b, 18d) are made of a transparent resin. However, each of the light guide paths may be a hollow. In this case, although the effect of reducing stray light reflection at the interface between each light guide path and the surrounding member (13c, 18e) made of the pigment-containing resin surrounding it cannot be obtained, stray light having entered the pigment-containing resin is absorbed by the pigment-containing resin. Accordingly, complicated multiple reflection of stray light is reduced to some extent.

In the above-described embodiments, the bottom surfaces of the wells in the microplate 20 were flat surfaces. It is preferable that the bottom surfaces of the wells be flat, because the contact of the surfaces with the light guide plate part 13 is good. However, the shape of the bottom surfaces of the wells need not be flat.

Figure 25:
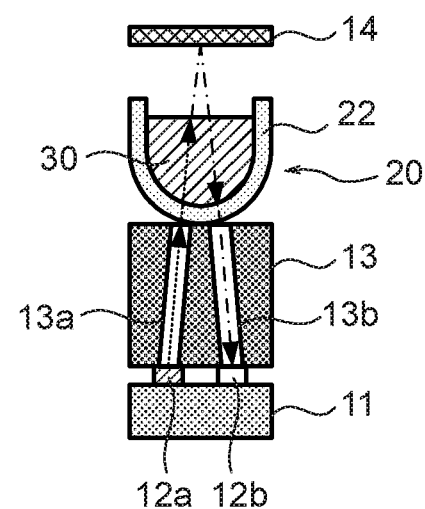
FIG. 25 is a diagram showing another example of a microplate.

For example, as shown in FIG. 25, the shape of the bottom surface of each well 22 of the microplate 20 may be spherical. In this case, a slight clearance is formed between the light exit end of the projecting-light guide path 13a and the bottom surface of the well 22 and between the light entrance end of the receiving-light guide path 13b and the bottom surface of the well 22. Therefore, there is a possibility that external light may enter the well and the receiving-light guide path 13b. However, by appropriately defining the cross-sectional areas and the light route lengths of the light guide paths 13a and 13b, the intensity of external light can be attenuated to a level so as not to affect measurement results.

In the above-described embodiments, each set of the light projecting/receiving unit (light source and light receiving sensor) may be activated individually and independently. In this case, depending on the number and positions of wells in the microplate, the necessary number of light projecting/receiving units in necessary positions can be selectively activated. Accordingly, the microplate reader can deal with microplates having different numbers of wells.

In the above-described embodiments, the number of light projecting/receiving units and the number of wells do not have to be the same. A microplate having a smaller number of wells than the number of light projecting/receiving units can be arranged.

In the above-described embodiments, it is not intended that the microplate be oriented horizontally, and the light projecting/receiving units may be oriented perpendicularly to the microplate. Modifications may be appropriately applied as long as the samples stored in the wells can be optical measured. For example, the microplate may be oriented vertically and/or the light projecting/receiving units may be oriented in oblique directions of the microplate.

Although specific embodiments have been described above, the embodiments are merely examples and are not intended to limit the scope of the present invention. The devices and methods described in the specification can be embodied in forms other than those described above. In addition, omissions, substitutions, and changes can be made as appropriate to the above-described embodiments without departing from the scope of the present invention. Such omissions, substitutions, and modifications are intended to be encompassed in the scope of the claims and their equivalents, and belong to the technical scope of the present invention.

REFERENCE SYMBOLS

10: Microplate reader
11: Substrate
12a: Light source
12b: Light receiving sensor
13: Light guide plate part
13a: Projecting-light guide path
13b: Receiving-light guide path
14: Mirror plate
14a: Reflecting surface
15: Housing
18: Microplate reader unit
20: Microplate
21: Wells
140: Prism type reflection member
140a: Prism
140d: Light transmissive plate
141: Prism positioning member
150: Light returning member
150a: Light returning portion
150b: Light reflecting coating portion.
151: First inclined surface
152: Second inclined surface

The invention claimed is:

1. A microplate reader comprising:
a housing;
multiple light projecting/receiving units located on a side of the microplate located within the housing, the number of the light projecting/receiving units being equal to or greater than the number of wells of the microplate, each light projecting/receiving unit comprising a set having a light projecting unit and a light receiving unit that correspond to one of the wells of the microplate;
a reflection member located on a side of the microplate opposite to a side of the light projecting/receiving units and configured to reflect light having passed through samples stored in the wells from the side of the light projecting/receiving units to the side of the light projecting/receiving units; and
a light guide part disposed between the light projecting/receiving units and the microplate, the light guide part comprising projecting-light guide paths each configured to guide the light emitted from the light projecting unit to the sample, receiving-light guide paths each configured to guide the light reflected by the reflection member and having passed through the sample to the light receiving unit, and a surrounding member comprising a pigment-containing resin surrounding the projecting-light guide paths and the receiving-light guide paths, the pigment-containing resin comprising a pigment having a property of absorbing light.

2. The microplate reader according to claim 1, wherein the light guide part is located above the light projecting/receiving units, the reflection member being located above the microplate located above the light guide part.

3. The microplate reader according to claim 1, further comprising a substrate comprising a power supply circuit for feeding power to multiple light projecting units and light receiving units, each of the light projecting units and the light receiving units being electrically connected to the substrate.

4. The microplate reader according to claim 1, wherein the light projecting units are light emitting diodes.

5. The microplate reader according to claim 1, wherein the light receiving units are light receiving sensors.

6. The microplate reader according to claim 1, wherein the light receiving units are optical fibers.

7. The microplate reader according to claim 1, wherein the reflection member is selectively provided on a surface facing the microplate depending on positions of the projecting-light guide paths and the receiving-light guide paths.

8. The microplate reader according to claim 1, wherein a horizontal distance between a light exit end of the projecting-light guide path and a light entrance end of the receiving-light guide path is shorter than a horizontal distance between a light entrance end of the projecting-light guide path and a light exit end of the receiving-light guide path.

9. The microplate reader according to claim 1, wherein an angle between an optical axis of the projecting-light guide path and a perpendicular direction that is perpendicular to the microplate is 0 degrees, and an angle between an optical axis of the receiving-light guide path and the perpendicular direction is 0 degrees.

10. The microplate reader according to claim 9, wherein the reflection member comprises optical elements configured to return incident light that has passed through the projecting-light guide paths and is incident on the reflection member at 180 degrees for causing the light to travel toward the side of the light projecting/receiving units.

11. The microplate reader according to claim 10, wherein an optical axis of the incident light that has passed through the projecting-light guide path and is incident on the reflection member and an optical axis of a returned light returned 180 degrees by the reflection member for entering the receiving-light guide path are spaced apart from each other at a predetermined interval.

12. The microplate reader according to claim 11, wherein the reflection member comprises first reflecting surfaces inclined at an angle of 45 degrees with respect to the perpendicular direction and second reflecting surfaces inclined at an angle of −45 degrees with respect to the perpendicular direction.

13. The microplate reader according to claim 12, wherein the reflection member comprises right-angle prisms each comprising the first reflecting surface and the second reflecting surface.

14. The microplate reader according to claim 12, wherein the reflection member is a plate member comprising recesses each comprising the first reflecting surface and the second reflecting surface.

15. The microplate reader according to claim 12, wherein each of the first reflecting surfaces and the second reflecting surfaces extends along an alignment direction of the wells.

16. The microplate reader according to claim 9, wherein the reflection member is a scattering plate that has a flat plate shape, the scattering plate configured to scatter incident light that has passed through the projecting-light guide paths and is incident on the reflection member for returning the light at 180 degrees for causing the light to travel toward the side of the light projecting/receiving units.

17. The microplate reader according to claim 9, wherein the reflection member comprises retroreflector type optical elements each comprising three reflecting surfaces and being configured to reflect incident light that has passed through a projecting-light guide path and is incident on the reflection member three times for returning the light at 180 degrees for causing the light to travel toward the side of the light projecting/receiving units.

18. The microplate reader according to claim 1, wherein a resin having a light transmission characteristic is embedded into at least parts of the projecting-light guide paths and the receiving-light guide paths, the resin being the same as a light-transmitting resin material in the pigment-containing resin.

19. The microplate reader according to claim 1, wherein an optical axis of the projecting-light guide path corresponding to a light projecting/receiving unit and an optical axis of the receiving-light guide path corresponding to the light projecting/receiving unit are in parallel to each other.

20. A microplate reader unit comprising:
a light projecting/receiving unit comprising a light projecting unit and a light receiving unit corresponding to one of wells of a microplate; and
a light guide part comprising a projecting-light guide path configured to guide light emitted from the light projecting unit to a sample stored in the corresponding well, a receiving-light guide path configured to guide light having passed through the projecting-light guide path and the sample, having returned, and having passed through the sample again to the light receiving unit, and a surrounding member comprising a pigment-containing resin surrounding the projecting-light guide path and the receiving-light guide path, the pigment-containing resin comprising a pigment having a property of absorbing light.

21. The microplate reader unit according to claim 20, wherein an angle between an optical axis of the projecting-light guide path and a perpendicular direction that is perpendicular to the microplate is 0 degrees, and an angle between an optical axis of the receiving-light guide path and the perpendicular direction is 0 degrees.

22. The microplate reader unit according to claim 20, wherein an optical axis of the projecting-light guide path and an optical axis of the receiving-light guide path are in parallel to each other.

* * * * *